US011952804B2

(12) United States Patent
Heiney et al.

(10) Patent No.: US 11,952,804 B2
(45) Date of Patent: Apr. 9, 2024

(54) RESTRAINT DEVICES

(71) Applicant: SCIP LLC, Ludlow, MA (US)

(72) Inventors: Jonathan Garry Heiney, Springfield, MA (US); John DePiano, Burlington, MA (US)

(73) Assignee: SCIP LLP, Ludlow, MA (US)

( * ) Notice: Subject to any disclaimer, the term of this patent is extended or adjusted under 35 U.S.C. 154(b) by 0 days.

(21) Appl. No.: 17/705,192

(22) Filed: Mar. 25, 2022

(65) Prior Publication Data

US 2022/0213721 A1 Jul. 7, 2022

Related U.S. Application Data

(63) Continuation of application No. 16/606,862, filed as application No. PCT/US2018/033024 on May 16, 2018, now Pat. No. 11,286,693.

(60) Provisional application No. 62/597,153, filed on Dec. 11, 2017, provisional application No. 62/507,331, filed on May 17, 2017.

(51) Int. Cl.
*E05B 75/00* (2006.01)

(52) U.S. Cl.
CPC .................................... *E05B 75/00* (2013.01)

(58) Field of Classification Search
CPC .......... E05B 75/00; E05B 75/005; A61F 5/37; Y10T 70/40; Y10T 70/404; Y10T 70/409; Y10T 70/411
USPC ........................................................ 70/14–19
See application file for complete search history.

(56) References Cited

U.S. PATENT DOCUMENTS

| | | | | | |
|---|---|---|---|---|---|
| 3,616,665 | A | * | 11/1971 | Rosenthal | E05B 75/00 70/455 |
| 4,226,100 | A | * | 10/1980 | Hampton | E05B 17/002 70/53 |
| 4,840,048 | A | * | 6/1989 | Elam | E05B 75/00 70/16 |
| 5,007,257 | A | * | 4/1991 | Thompson | E05B 75/00 224/914 |
| 5,555,751 | A | * | 9/1996 | Strickland | E05B 75/00 70/16 |

(Continued)

FOREIGN PATENT DOCUMENTS

| | | |
|---|---|---|
| CN | 204590863 | 8/2015 |
| CN | 105528856 | 4/2016 |

(Continued)

OTHER PUBLICATIONS

China Office Action dated Jul. 29, 2020 in related application No. 201880037121 filed May 16, 2018 (3 pages).

(Continued)

*Primary Examiner* — Suzanne L Barrett
(74) *Attorney, Agent, or Firm* — Dentons US LLP

(57) ABSTRACT

This disclosure discloses a restraint device including a pair of bracelets that are adjustable in distance therebetween, while at least one of the bracelets can be dually engaged during a restraint and dually disengaged not during the restraint. Further, this disclosure discloses a sleeve to enable a restraint device to be converted from a "chain style" into a "hinge style" and vice versa. Additionally, this disclosure discloses a restraint device including a first arm and a second arm, where the second arm is elastically coupled to the first arm in order to avoid overtightening when restraining.

18 Claims, 34 Drawing Sheets

(56) References Cited

U.S. PATENT DOCUMENTS

| | | | | | |
|---|---|---|---|---|---|
| 5,638,710 | A * | 6/1997 | Howard, Jr. | B62D 43/007 | 414/463 |
| 5,660,064 | A | 8/1997 | Ecker et al. | | |
| 5,732,576 | A * | 3/1998 | Moore | E05B 75/00 | 128/878 |
| 5,743,117 | A | 4/1998 | Woo et al. | | |
| 6,000,249 | A * | 12/1999 | Wilber | E05B 75/00 | 119/857 |
| 7,010,943 | B1 * | 3/2006 | Earl | E05B 75/00 | 70/16 |
| 7,073,708 | B2 * | 7/2006 | Moorhouse | E05B 19/0035 | 70/56 |
| 7,140,208 | B1 | 11/2006 | Parsons et al. | | |
| 7,210,317 | B2 * | 5/2007 | Beane | E05B 75/00 | 128/878 |
| 7,340,926 | B2 | 3/2008 | Kim et al. | | |
| 8,026,792 | B2 * | 9/2011 | Powers | E05B 51/02 | 70/56 |
| 8,156,772 | B2 * | 4/2012 | Buhl | E05B 71/00 | 70/53 |
| 8,776,555 | B1 | 7/2014 | Lofgren | | |
| 8,904,832 | B1 | 12/2014 | Rodriguez et al. | | |
| 9,902,590 | B2 | 2/2018 | Dufek | | |
| 10,030,412 | B2 * | 7/2018 | Danner, Jr. | E05B 75/00 | |
| 2003/0182978 | A1 * | 10/2003 | Miranda | E05B 67/38 | 70/56 |
| 2004/0216501 | A1 | 11/2004 | Clifton | | |
| 2005/0193782 | A1 | 9/2005 | Beane et al. | | |
| 2008/0173048 | A1 | 7/2008 | Kim et al. | | |
| 2010/0031709 | A1 | 2/2010 | Kim et al. | | |
| 2013/0133382 | A1 * | 5/2013 | Thompson | E05B 75/00 | 70/431 |
| 2015/0068256 | A1 | 3/2015 | Flynn | | |
| 2017/0081878 | A1 * | 3/2017 | Danner, Jr. | E05B 75/00 | |
| 2017/0114573 | A1 | 4/2017 | Kovac | | |
| 2018/0119459 | A1 | 5/2018 | Parsons | | |
| 2018/0119460 | A1 | 5/2018 | Parsons | | |

FOREIGN PATENT DOCUMENTS

| | | |
|---|---|---|
| GB | 2467748 | 8/2010 |
| TW | M353246 | 3/2009 |

OTHER PUBLICATIONS

China Office Action dated Aug. 28, 2020 in related application No. 2019113256729 filed May 16, 2018 (3 pages).

Europe Supplementary Search Report dated Feb. 12, 2021 in related application No. 18801359.3 filed May 16, 2018 (7 pages).

Europe Supplementary Search Report dated Apr. 22, 2020 in related application No. 19216264.2 filed May 16, 2018 (7 pages).

International Search Report and Written Opinion dated Aug. 30, 2018 in related application No. PCT/US18/033024 filed May 16, 2018 (7 pages).

* cited by examiner

106

106

RESTRAINT DEVICES

CROSS-REFERENCE TO RELATED PATENT APPLICATIONS

This patent application is a continuation of U.S. patent application Ser. No. 16/606,862, filed 21 Oct. 2019; which is a National Phase of International Application PCT/US18/33024 filed 16 May 2018; which claims a benefit of priority to U.S. patent application 62/597,153 filed 11 Dec. 2017 and a benefit of priority to U.S. patent application 62/507,331 filed 17 May 2017; each of which is incorporated by reference herein for all purposes.

TECHNICAL FIELD

This disclosure relates to restraint devices.

BACKGROUND

There is a desire for a technology to enable a restraint device, which includes a pair of bracelets that can adjust in distance therebetween, while at least one of the bracelets can be dually engaged during a restraint and dually disengaged not during the restraint. Further, there is a desire for a technology to enable a restraint device to be converted from a “chain style” into a “hinge style” and vice versa. Additionally, there is a desire for a technology to enable a restraint device to avoid overtightening when restraining. However, such technologies do not exist. Therefore, this disclosure enables such technologies.

SUMMARY

In an embodiment, a restraint device comprises: a housing; an arm coupled to the housing pivotally, wherein the arm includes a first set of teeth; a first bar housed within the housing pivotally, wherein the first bar includes a second set of teeth and a projection; a second bar housed within the housing such that the second bar travels between a first position and a second position, wherein the second bar includes a depression configured to enclose the projection as the second bar is in the first position such that the second set of teeth disengages the first set of teeth, wherein the depression is configured not to enclose the projection as the second bar is in the second position such that the second set of teeth engages the first set of teeth; a first spring housed within the housing, wherein the first spring engages the first bar and the second bar; a reel housed within the housing, wherein the reel includes a third set of teeth; a second spring housed within the housing; and a pivot housed within the housing such that the pivot rotates between a third position and a fourth position, wherein the pivot hosts a first extension, a second extension, and a third extension, wherein the first extension engages at least one tooth of the first set of teeth as the second set of teeth engages the first set of teeth and the second extension engages at least one tooth of the third set of teeth when the pivot is in the third position, wherein the first extension avoids engaging the first set of teeth as the second set of teeth avoid engaging the first set of teeth and the second extension avoids engaging the third set of teeth when the pivot is in the fourth position, wherein the second spring engages the third extension.

In an embodiment, a restraint device comprises: a first bracelet including a first housing and a reel, wherein the reel hosts a cable; a second bracelet including a second housing, wherein the cable is coupled to the second housing; and a sleeve mounted onto the first housing and the second housing such that the cable extends through the sleeve.

In an embodiment, a restraint device comprises: a housing; a bar housed within the housing pivotally, wherein the bar hosts a first set of teeth and a second set of teeth, wherein the first set of teeth and the second set of teeth are configured to mesh in opposing directions; a first arm coupled to the housing pivotally, wherein the first arm hosts a third set of teeth, wherein the first set of teeth is configured to mesh with the third set of teeth; a spring hosted within the first arm and engaging the first arm; and a second arm coupled to the first arm pivotally and engaging the spring, wherein the second arm hosts a fourth set of teeth, wherein the fourth set of teeth is configured to mesh with the second set of teeth when the spring is compressed, wherein the fourth set of teeth is configured to avoid meshing with the second set of teeth when the spring is not compressed.

DETAILED DESCRIPTION OF PREFERRED EMBODIMENTS

Figure 1:
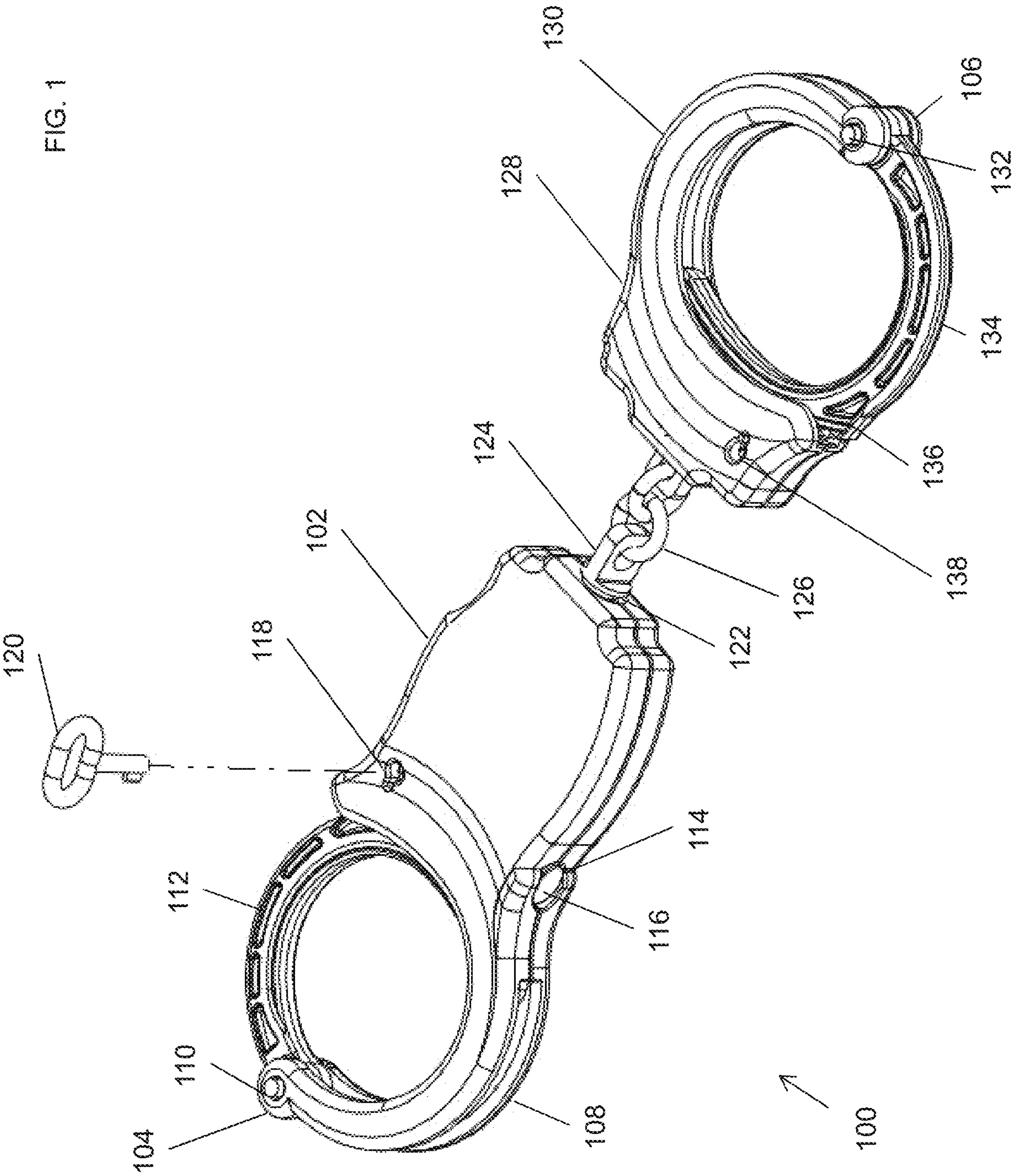
FIG. 1 shows a perspective view of an embodiment of a restraint device according to this disclosure.

Generally, this disclosure discloses a restraint device including a pair of bracelets that are adjustable in distance therebetween, while at least one of the bracelets can be dually engaged during a restraint and dually disengaged not during the restraint. Further, this disclosure discloses a sleeve to enable a restraint device to be converted from a "chain style" into a "hinge style" and vice versa. Additionally, this disclosure discloses a restraint device including a first arm and a second arm, where the second arm is elastically coupled to the first arm in order to avoid overtightening when restraining. This disclosure is now described more fully with reference to FIGS. 1-34, in which various example embodiments of this disclosure are shown. This disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

FIG. 1 shows a perspective view of an embodiment of a restraint device according to this disclosure. In particular, a restraint device 100 includes a first bracelet 104 and a second bracelet 106.

The first bracelet 104 includes a first housing 102. The first housing 102 defines a first interior cavity, a first opening 114, a second opening 118, and a third opening 122, all of which are sized and shaped differently, although variations or non-variations on size and shape are possible. The first opening 114 extends along a width plane of the first housing 102, whereas the second opening 118 extends along a depth plane of the first housing 102 and the third opening 122 extends along a longitudinal plane of the first housing 102. The first opening 114 hosts a button 116, which is further described below. The second opening 118 is dimensioned to receive a key 120, which is further described below. The third opening 122 is dimensioned to host an anchor 124, which is further described below. The first housing 102 is metal, but can include plastic, rubber, wood, or others. The first housing 102 can be of a pivotal clamshell type (two pivotally coupled plates) or a sandwich plate type (two mating plates).

The first housing 102 includes a first arm portion 108 extending therefrom in a cantilevered manner. The first arm portion 108 is unitary with the first housing 102, but can be assembled with the first housing 102, such as via fastening, mating, adhering, pivoting, or others. The first arm portion 108 is arcuate, but can be shaped differently, such as linear or others. The first arm portion 108 includes metal, but can include plastic, rubber, wood, or others.

The first arm portion 108 hosts a first pin 110 riveted thereto, but other forms of coupling are possible, such as fastening, mating, interlocking, adhering, or others. The first pin 110 is rectilinear and includes metal, but can be shaped differently, such as arcuate or others, or include plastic, rubber, wood, or others.

The first arm portion 108 is coupled to a first arm 112 via the first pin 110 in a cantilevered manner. The first arm 112 is arcuate, but can be shaped differently, such as linear or others. The first arm 112 includes metal, but can include plastic, rubber, wood, or others. Resultantly, the first bracelet 104 is defined via the first housing 102, the first arm portion 108, and the first arm 112.

The second bracelet 106 includes a second housing 128. The second housing 128 defines a second interior cavity and a fourth opening 138, all of which are sized and shaped differently, although variations or non-variations on size and shape are possible. The fourth opening 138 extends along a depth plane of the second housing 128. The fourth opening 138 is dimensioned to receive the key 120, which is further described below. The second housing 128 is metal, but can include plastic, rubber, wood, or others.

The second housing 128 includes a second arm portion 130 extending therefrom in a cantilevered manner. The second arm portion 130 is unitary with the second housing 128, but can be assembled with the second housing 128, such as via fastening, mating, adhering, pivoting, or others. The second arm portion 130 is arcuate, but can be shaped differently, such as linear or others. The second arm portion 130 includes metal, but can include plastic, rubber, wood, or others.

The second arm portion 130 hosts a second pin 132 riveted thereto, but other forms of coupling are possible, such as fastening, mating, interlocking, adhering, or others. The second pin 130 is rectilinear and includes metal, but can be shaped differently, such as arcuate or others, or include plastic, rubber, wood, or others.

The second arm portion 130 is coupled to a second arm 134 via the second pin 130 in a cantilevered manner. The second arm 134 is arcuate, but can be shaped differently, such as linear or others. The second arm 134 includes metal, but can include plastic, rubber, wood, or others. The second arm 134 hosts a set of teeth 136, which is further described below. Resultantly, the second bracelet 106 is defined via the second housing 128, the second arm portion 130, and the second arm 134.

The first bracelet 104 and the second bracelet 106 are coupled to each via a chain 126 spanning therebetween. The chain 126 includes at least one link, which is oval, but can be of any shape, such as circular, triangular, or others, and includes metal, but can include plastic, rubber, wood, or others. Note that a cable, a rope, a wire, a string, or other line types can be used, whether additional or alternative to the chain 126.

Figure 2:
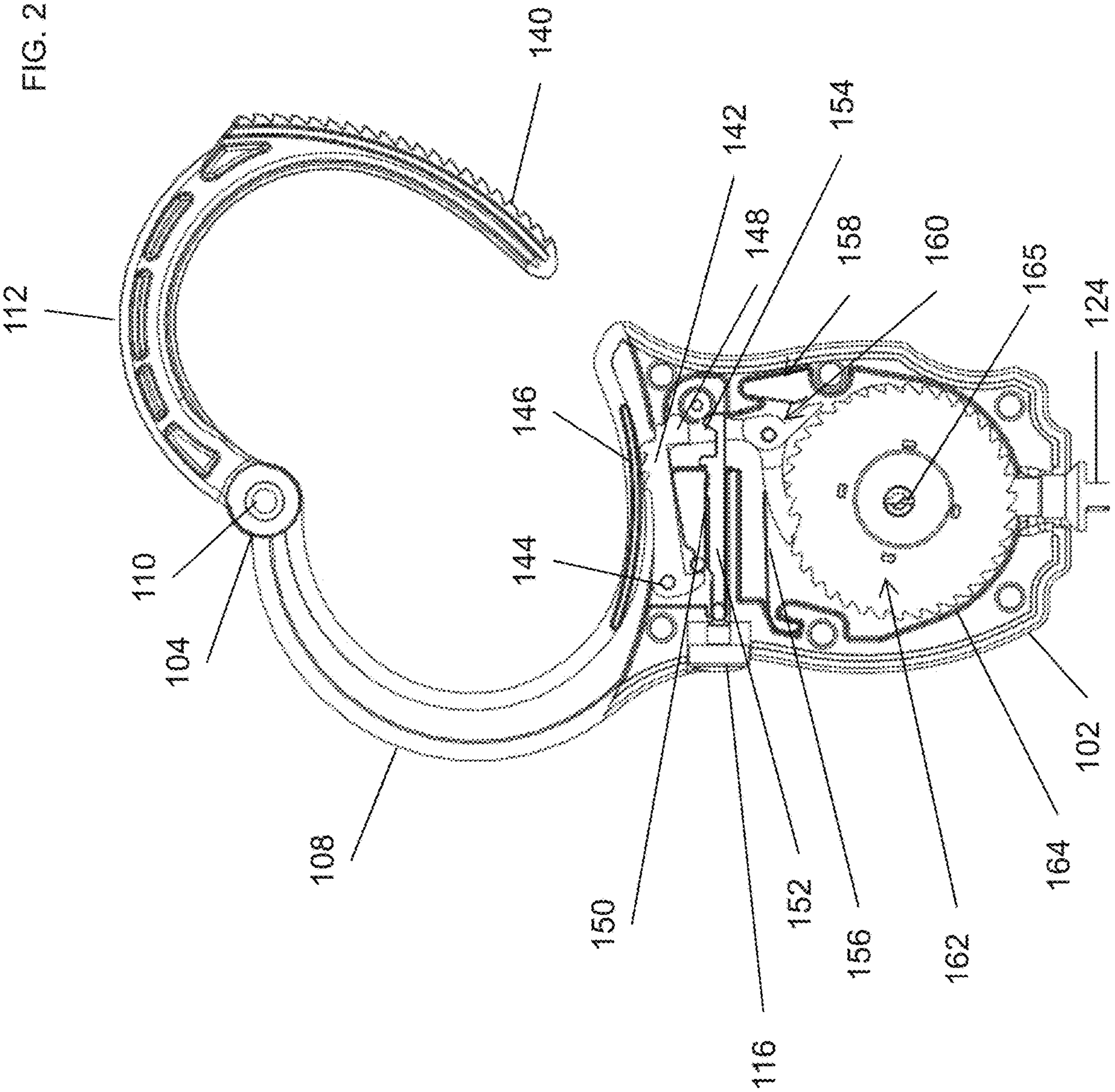
FIG. 2 shows a side view of an embodiment of a housing with a cover plate removed according to this disclosure.
Figure 3:
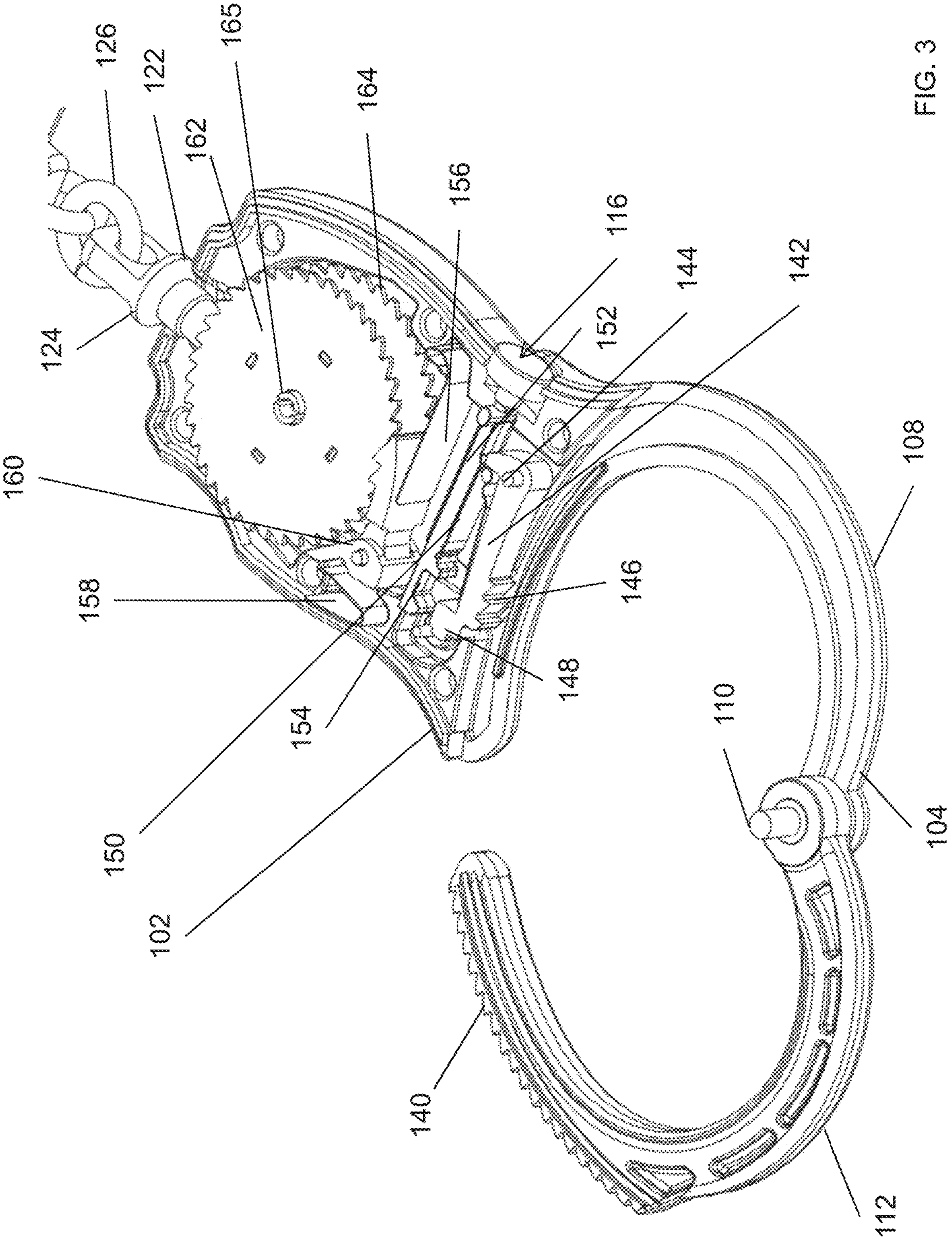
FIG. 3 shows a perspective view of an embodiment of a housing with a cover plate removed according to this disclosure.

FIG. 2 shows a side view of an embodiment of a housing with a cover plate removed according to this disclosure. FIG. 3 shows a perspective view of an embodiment of a housing with a cover plate removed according to this disclosure. In particular, the first arm 112 includes a set of teeth 140. The first housing 102 hosts a first bar 142 and a first shaft 144 therein. The first bar 142 is pivotally coupled to the first housing 102 via the shaft 144. The first bar 142 hosts a set of teeth 146 and a projection 148. The set of teeth 140 is configured to mesh and thereby engage with the set of teeth 146. The set of teeth 146 opposes the projection 148 on the first bar 142. The projection 148 is square shaped, but such shaping can vary, such as triangular, pentagonal, oval, circular, or others.

The first housing 102 hosts a second bar 152 therein such that the second bar 152 is able to travel between a first position (locked) and a second position (unlocked) along the width plane of the first housing 102, which is further described below. The second bar 152 hosts a depression 154 configured to enclose and receive the projection 148 as the second bar 152 is in the second position such that the set of teeth 146 does not securely engage the set of teeth 140, as further described below. Likewise, the depression 154 is configured not to enclose and not receive the projection 148 as the second bar 152 is positioned in the first position such that the set of teeth 146 securely engage the set of teeth 140, as further described below. The button 116 is mechanically linked to the second bar 152 such that the button 116 can cause the bar 152 to travel between the first position and the second position along the width plane of the first housing 102, which is further described below.

The first housing 102 hosts a first spring 150 therein such that the first spring 150 engages the first bar 142 and the second bar 152. Note that the first spring 150 is not V-shaped, although V-shaping is possible. The first spring 150 extends about a shaft housed within the first housing 102, with such shaft extending along the depth plane of the first housing 102 and between the first bar 142 and the second bar 152.

The first housing 102 hosts a second spring 158 and a third spring 156 therein. The second spring 158 is V-shaped, but other shaping is possible, such as U-shape or others. The second spring 158 engages the first housing 102. The third spring 156 is J-shaped, but other shaping is possible, such as U-shape, V-shape, or others. The third spring 156 engages the first housing 102.

The first housing 102 hosts a pivot 160 therein such that the pivot rotates about an axis between a third position and a fourth position, which is further described below. The axis extends along the depth plane of the first housing 102. The axis extends longitudinally between the second spring 158 and the third spring 158.

The first housing 102 hosts an axle 165 and a reel 162. The axle 165 extends longitudinally along the depth plane of the first housing 102. The reel 162 includes a set of teeth 164 and is mounted onto the axle 165 such that the reel 162 can rotate about the axle 165. Note that the reel 162 can include a spool.

Figure 4:
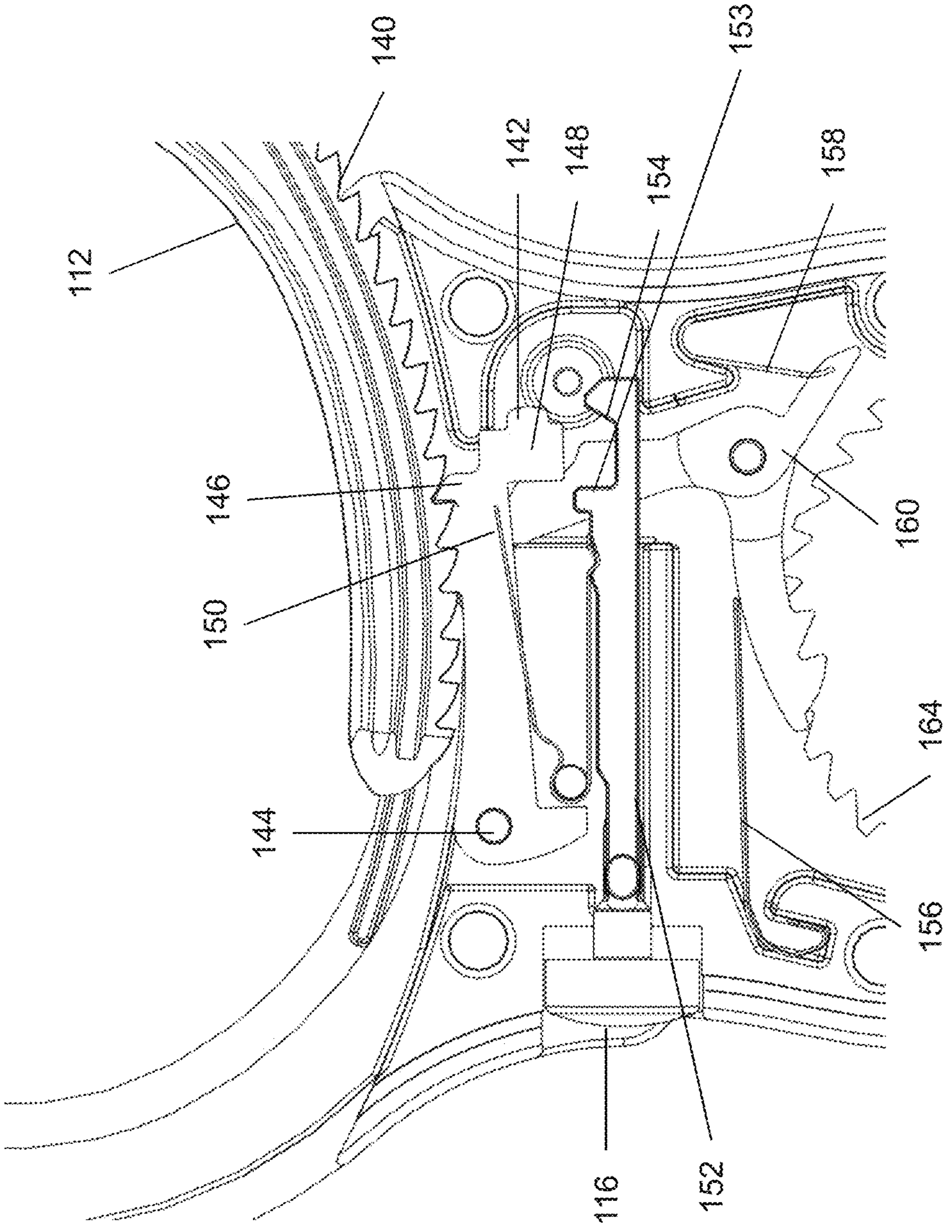
FIG. 4 shows a side view of an embodiment of a housing with a cover plate removed and a safety lock being disengaged according to this disclosure.

FIG. 4 shows a side view of an embodiment of a housing with a cover plate removed and a safety lock being disengaged according to this disclosure. In particular, the second bar 152 includes a wall 153, which partially defines the depression 154. The button 116 is mechanically linked to the second bar 152 such that the button 116 can cause the second bar 152 to travel between the first position (locked) and the second position (unlocked) along the width plane of the first housing 102 (laterally), which is further described below. As shown here, the button 116 is not pressed such that the second bar 152 is in the second position. When the second bar 152 is in the second position, the first bar 142 can pivot about the first shaft 144. Such pivoting can cause the depression 154 to enclose the projection 148 and the depression 154 to receive the projection 148 as the set of teeth 146 engage the set of teeth 140, as urged via the first spring 150, to enable a clockwise rotation of the first arm 112. Therefore, the first arm 112 can rotate about the first pin 110 as the set of teeth 146 engage the set of teeth 140 (no restraint).

Figure 5:
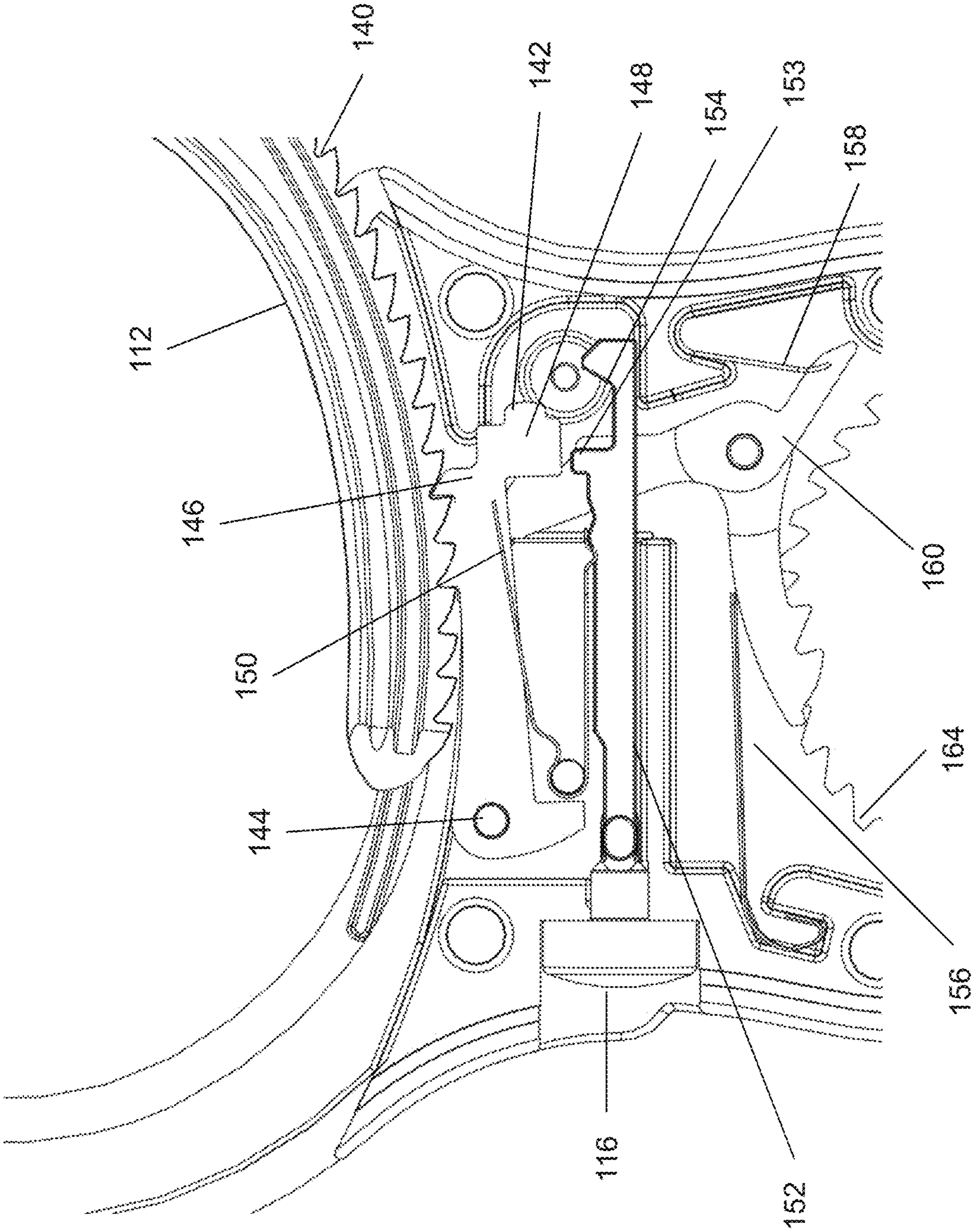
FIG. 5 shows a side view of an embodiment of a housing with a cover plate removed and a safety lock being engaged according to this disclosure.

FIG. 5 shows a side view of an embodiment of a housing with a cover plate removed and a safety lock being engaged according to this disclosure. In particular and in contrast to FIG. 4, the button 116 is pushed toward the projection 148 such that the second bar 152 travels from the second position (unlocked) to the first position (locked) along the width plane of the first housing 102 (laterally). The button 116 can be pushed in various ways. For example, the button 116 can be pushed via the key 120 forcibly contacting the button 116 through the first opening 114 or a pin sized to fit into first opening 114 and forcibly contacting the button 116.

When the second bar 152 is positioned in the first position, the first bar 142 can pivot about the first shaft 144. However, such pivoting is unable to cause the depression 154 to enclose the projection 148 and the depression 154 to receive the projection 148 because the projection 148 engages the wall 153, which blocks further movement of the projection 148, away from the set of teeth 140, as the set of teeth 146 engage the set of teeth 140. Therefore, the first arm 112 cannot rotate about the first pin 110 as the set of teeth 146 engage the set of teeth 140 (restraint). Note that the second bar 152 can travel from the first position (locked) to the second position (unlocked) via the key 120 being inserted into the second opening 118 and rotationally engaging the second bar 152 opposite from the button 116. For example, the key 120 can be rotated clockwise to release the second bar 152 and counterclockwise to release the first bar 142 to release the first arm 112.

Figure 6:
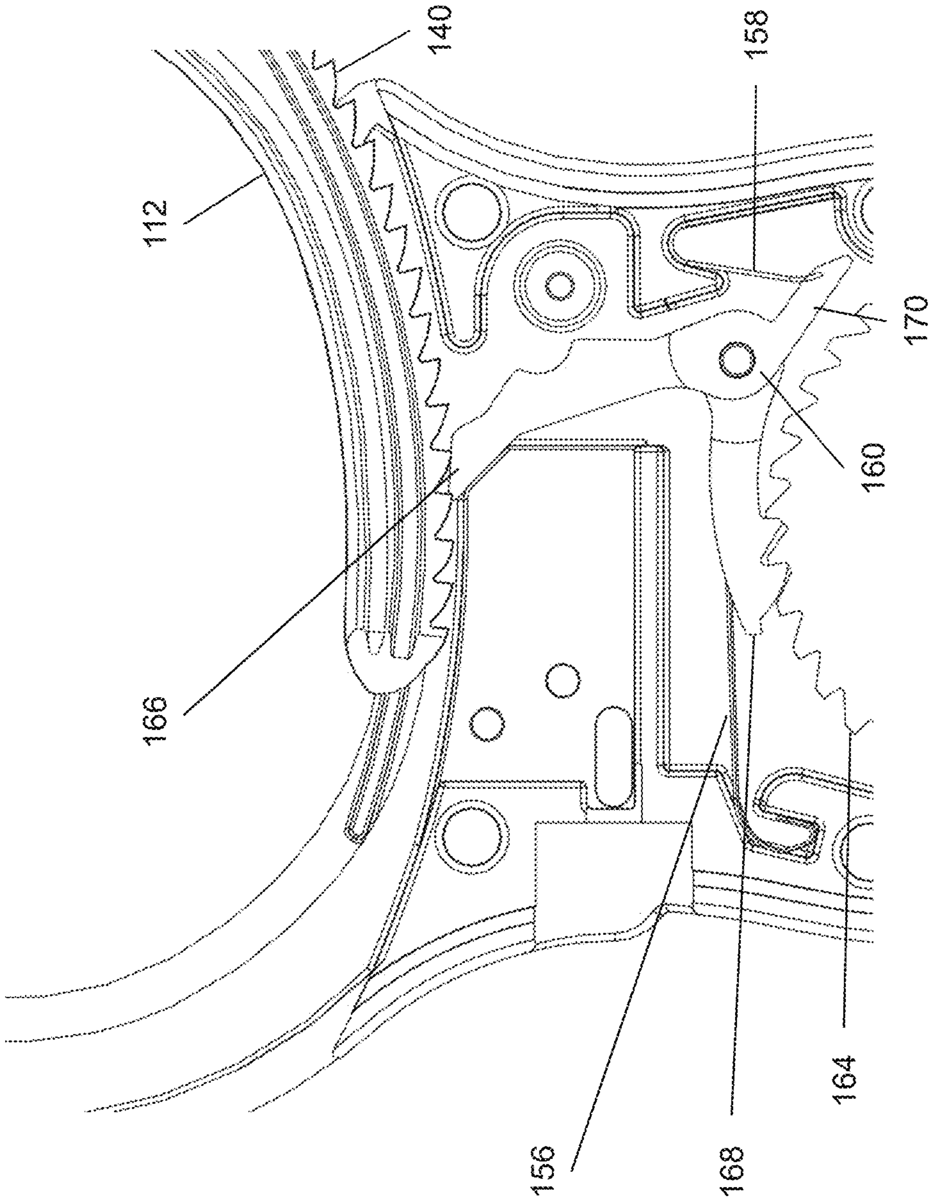
FIG. 6 shows a side view of an embodiment of a housing with a cover plate removed and a pivot engaging an arm and a spool according to this disclosure.

FIG. 6 shows a side view of an embodiment of a housing with a cover plate removed and a pivot engaging an arm and a spool according to this disclosure. In particular, the pivot 160 hosts a first extension 166, a second extension 168, and a third extension 170, any of which may be similar or dissimilar in shape or size or may include metal, plastic, or others or may be unitary or assembled with the pivot 160, such as via fastening, mating, or others. The pivot 160 can rotate between the second spring 158 and the third spring 156. The first extension 166 and the second extension 168 are angled therebetween at about ninety degrees or less. The first extension 166 and the third extension 170 are angled therebetween at about one hundred eighty degrees or less. The second extension 168 and the third extension 170 are angled therebetween at about one hundred eighty degrees or less. The first extension 166 extends away from the reel along the first bar 142 and the second bar 152. Note that the first housing 102 includes a pair of plates (sides) and, as such, the first bar 142, the second bar 152, and the first extension 116 are positioned between the pair of sides, where the first extension 166 extends between the first bar 142 or the second bar 152 and one side of the pair of sides. The second spring 158 engages the third extension 170 and the first housing 102. The third spring 156 engages the second extension 168 and the first housing 102.

When the second bar 152 is positioned in the first position (locked) and the pivot 160 is rotated to the third position, as urged via the second spring 158 or the third spring 156, the first extension 166 engages at least one tooth of the set of teeth 140 of the first arm 112 as the set of teeth 146 of the first bar 142 also engages the set of teeth 140 of the first arm 112, while the second extension 168 engages at least one tooth of the set of teeth 164 of the reel 162, as urged via the second spring 158 or the third spring 156. As such, the second extension 168 locks the reel 162 from rotation as the first arm 112 securely engages the first extension 166. The first extension 166 allows the third spring 156 to push the second extension 168 into the set of teeth 164, thereby allowing rotation in a single direction, such as counterclockwise or others.

Figure 7:
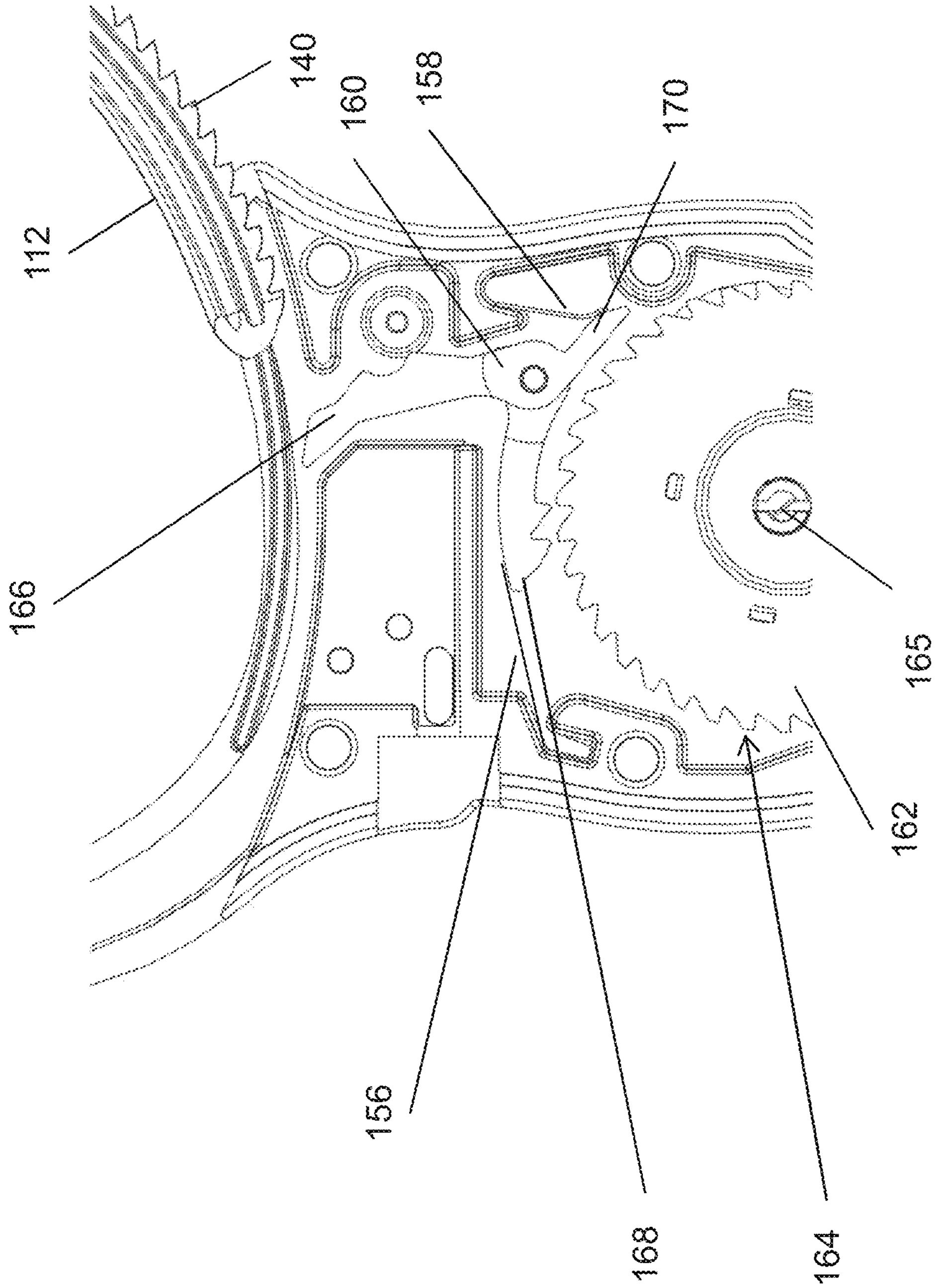
FIG. 7 shows a side view of an embodiment of a housing with a cover plate removed and a pivot not engaging an arm and a spool according to this disclosure.

FIG. 7 shows a side view of an embodiment of a housing with a cover plate removed and a pivot not engaging an arm and a spool according to this disclosure. In particular and in contrast to FIG. 6, when the second bar 152 is positioned in the second position (unlocked) and the pivot 160 is rotated to the fourth position, as urged via the second spring 158 or the third spring 156, the first extension 166 avoids engaging the set of teeth 140 of the first arm 112 as the set of teeth 146 of the first bar 142 also avoids engaging the set of teeth 140 of the first arm 112, while the second extension 168 avoids engaging the set of teeth 164 of the reel 162, as urged via the second spring 158 or the third spring 156. As such, the second extension 168 unlocks the reel 162 to enable free rotation as the first arm 112 does not securely engage the first extension 166. The first extension 166 is forced open by the second spring 158, which forces the second extension 168 to disengage from the reel 162 and thereby let the reel 162 to rotate freely. Therefore, the reel 162 is configured to rotate freely when the set of teeth 140 avoid engaging the set of teeth 146 and the first extension 166.

Figure 8:
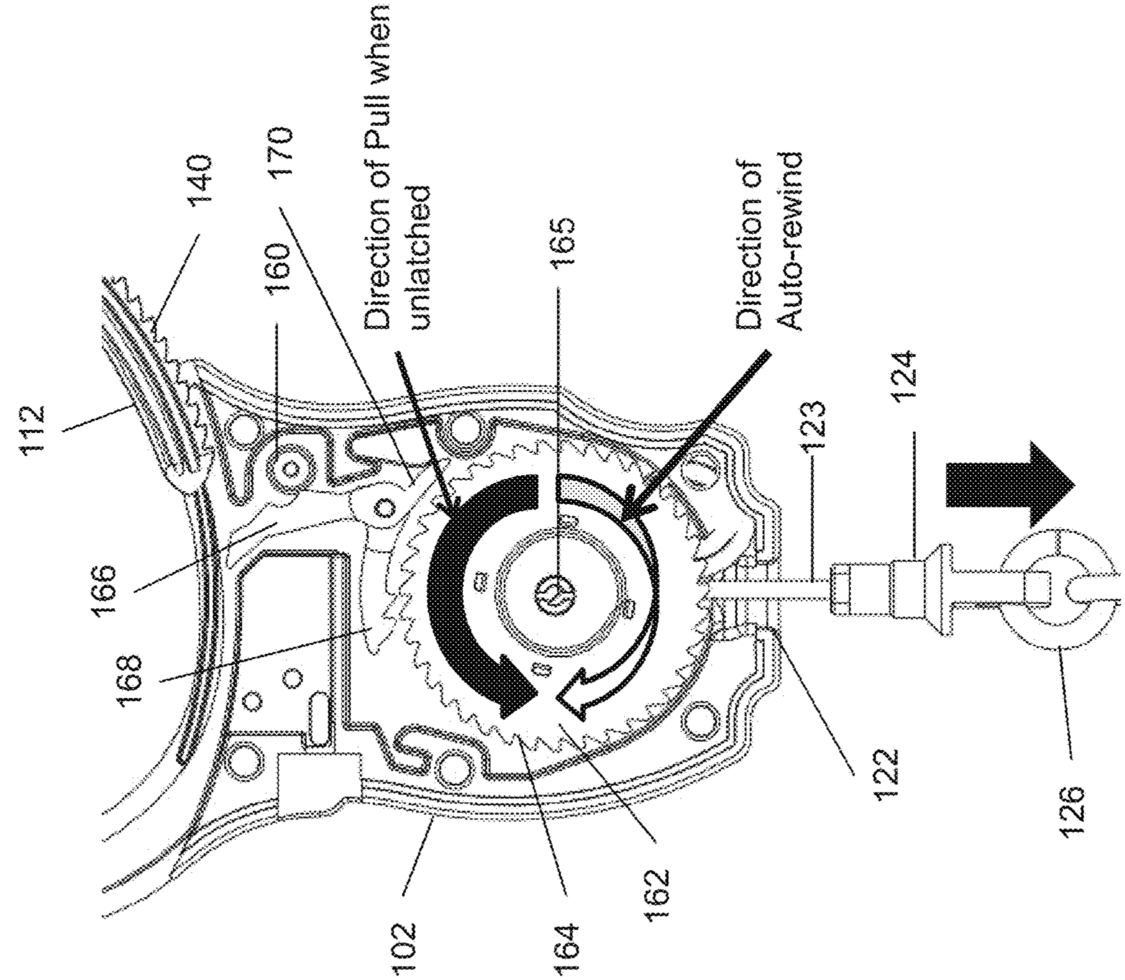
FIG. 8 shows a side view of an embodiment of a housing with a cover plate removed and a pair of rotary directions of a spool according to this disclosure.

FIG. 8 shows a side view of an embodiment of a housing with a cover plate removed and a pair of rotary directions of a spool according to this disclosure. In particular, the reel 162 hosts a constant-force-spring. Further, the reel 162 is coupled to a cable 123, such as via fastening, mating, or others. The cable 123 is coupled to the anchor 124, such as via fastening, mating, or others. Note that the cable 123 can include any type of line, such as a rope, a chain, a cord, or others. Therefore, when the set of teeth 140 of the first arm 112 avoid engaging the set of teeth 146 of the first bar 142 and the first extension 166, the constant-force-spring can rewind the reel 162 and thereby the cable 123 into the first housing 102. Note that directionality of rotation of the reel 162 can be varied, such as reversed from what is shown in FIG. 8.

Figure 9:
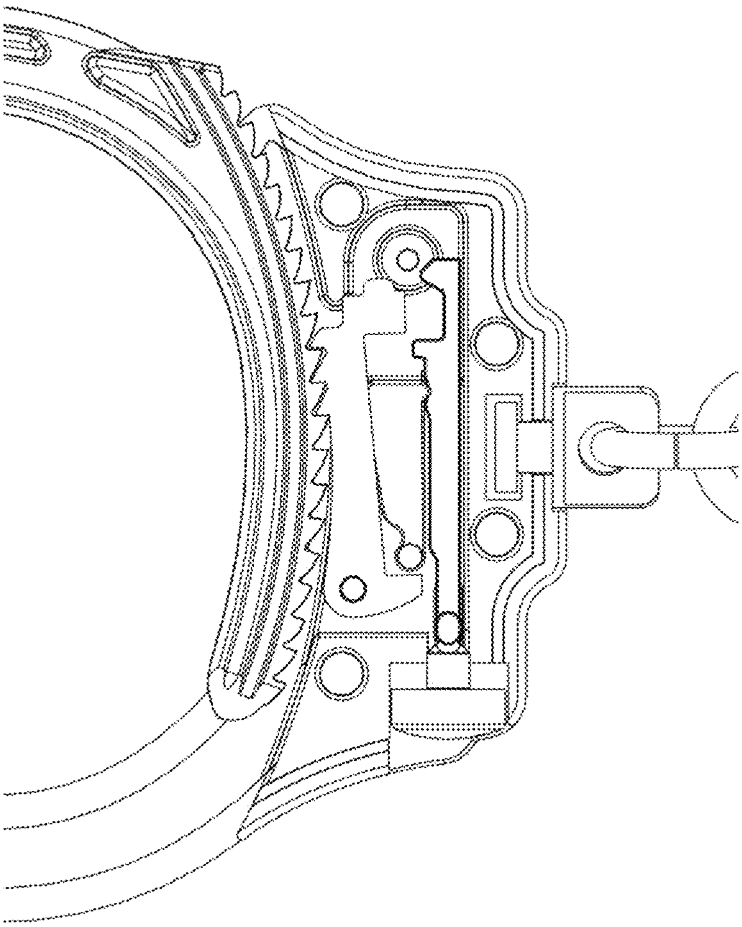
FIG. 9 shows a side view of an embodiment of a housing with a cover plate removed and a safety lock being disengaged according to this disclosure.
Figure 10:
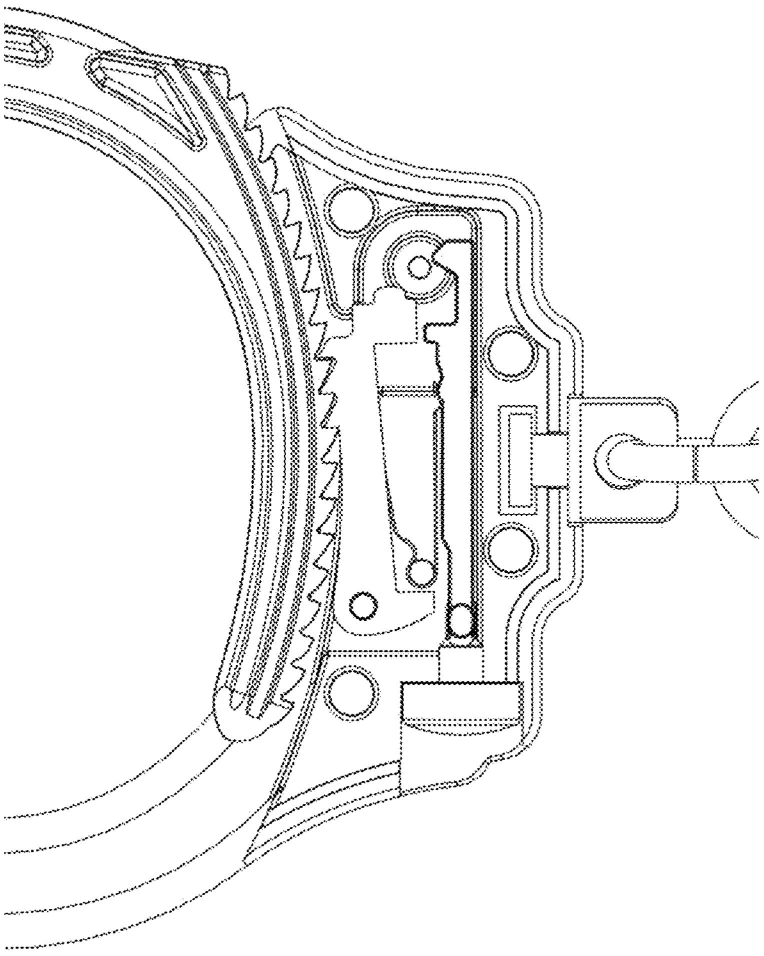
FIG. 10 shows a side view of an embodiment of a housing with a cover plate removed and a safety lock being engaged according to this disclosure.
Figure 11:
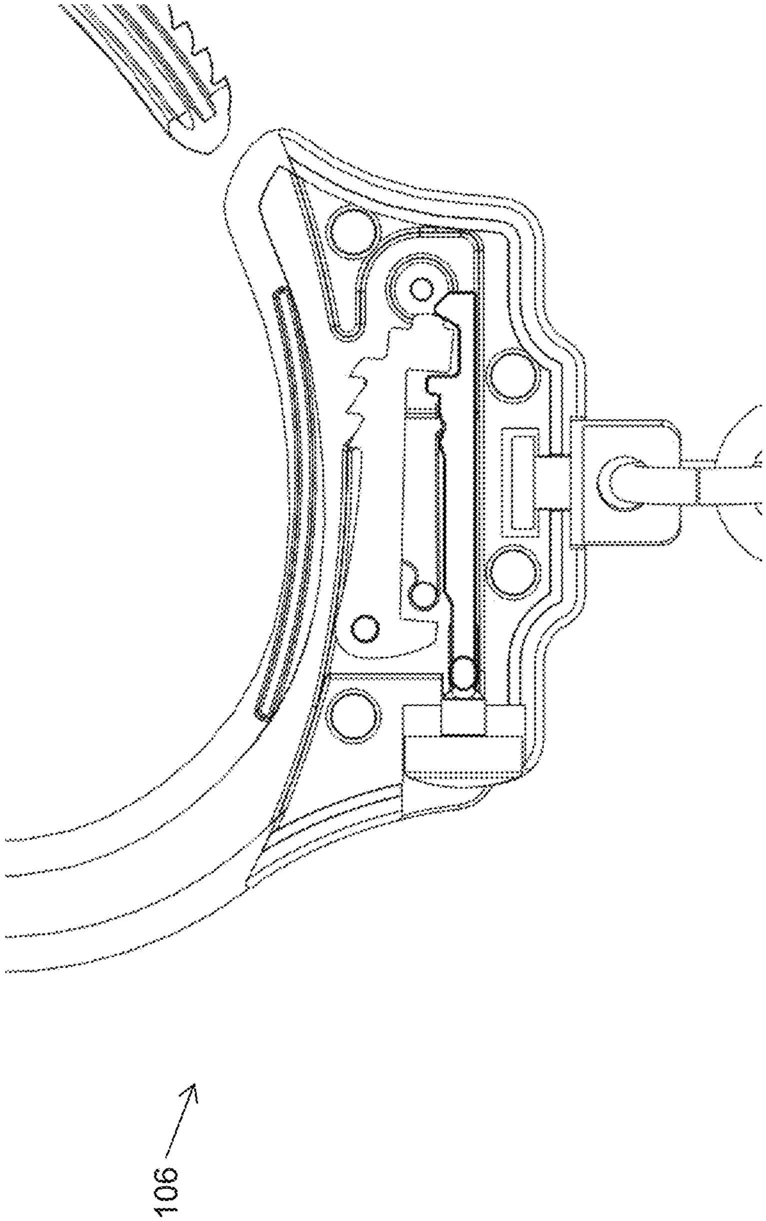
FIG. 11 shows a side view of an embodiment of a housing with a cover plate removed and a projection of a first bar being enclosed via a depression of a second bar according to this disclosure.

FIG. 9 shows a side view of an embodiment of a housing with a cover plate removed and a safety lock being disengaged according to this disclosure. FIG. 10 shows a side view of an embodiment of a housing with a cover plate removed and a safety lock being engaged according to this disclosure. FIG. 11 shows a side view of an embodiment of a housing with a cover plate removed and a projection of a first bar being enclosed via a depression of a second bar according to this disclosure. In particular, the second bracelet 106 operates similarly to the first bracelet 104, but without the pivot 160.

With reference to FIG. 1, FIG. 9 illustrates the set of teeth 146 of the first bar 142 engaging with the set of teeth 136 of the second arm 134 when the button 116 is not pressed and the second bar 152 is positioned in the second position (unlocked). In particular, the first bar 142 can pivot about the first shaft 144. Such pivoting can cause the depression 154 to enclose the projection 148 and the depression 154 to receive the projection 148 as the set of teeth 146 engage the set of teeth 136, as urged via the first spring 150, to enable a clockwise rotation of the second arm 134. Therefore, the second arm 134 can rotate about the second pin 132 as the set of teeth 146 engage the set of teeth 136 (no restraint).

With reference to FIG. 1, FIG. 10 contrasts FIG. 9 and illustrates the button 116 is pushed toward the projection 148 such that the second bar 152 travels from the second position (unlocked) to the first position (locked) along the width plane of the second housing 128 (laterally). The button 116 can be pushed in various ways. For example, the button 116 can be pushed via the key 120 forcibly contacting the button 116 through an opening in the second housing 128 or a pin sized to fit into that opening and forcibly contacting the button 116.

When the second bar 152 is positioned in the first position, the first bar 142 can pivot about the first shaft 144. However, such pivoting is unable to cause the depression 154 to enclose the projection 148 and the depression 154 to receive the projection 148 because the projection 148 engages the wall 153, which blocks further movement of the projection 148, away from the set of teeth 134, as the set of teeth 146 engage the set of teeth 134. Therefore, the second arm 134 cannot rotate about the second pin 132 as the set of teeth 146 engage the set of teeth 134 (restraint). Note that the second bar 152 can travel from the first position (locked) to the second position (unlocked) via the key 120 being inserted into the fourth opening 138 and rotationally engaging the second bar 152 opposite from the button 116. For example, the key 120 can be rotated clockwise to release the second bar 152 and counterclockwise to release the first bar 142 to release the second arm 134.

With reference to FIG. 1, FIG. 11 contrasts FIG. 10 and illustrates the depression 154 enclosing the projection 148 and the depression 154 receiving the projection 148 as the set of teeth 146 engage the set of teeth 136, as urged via the first spring 150, to enable a clockwise rotation of the second arm 134. Therefore, the second arm 134 can rotate about the second pin 132 as the set of teeth 146 engage the set of teeth 136 (no restraint).

Figure 12:
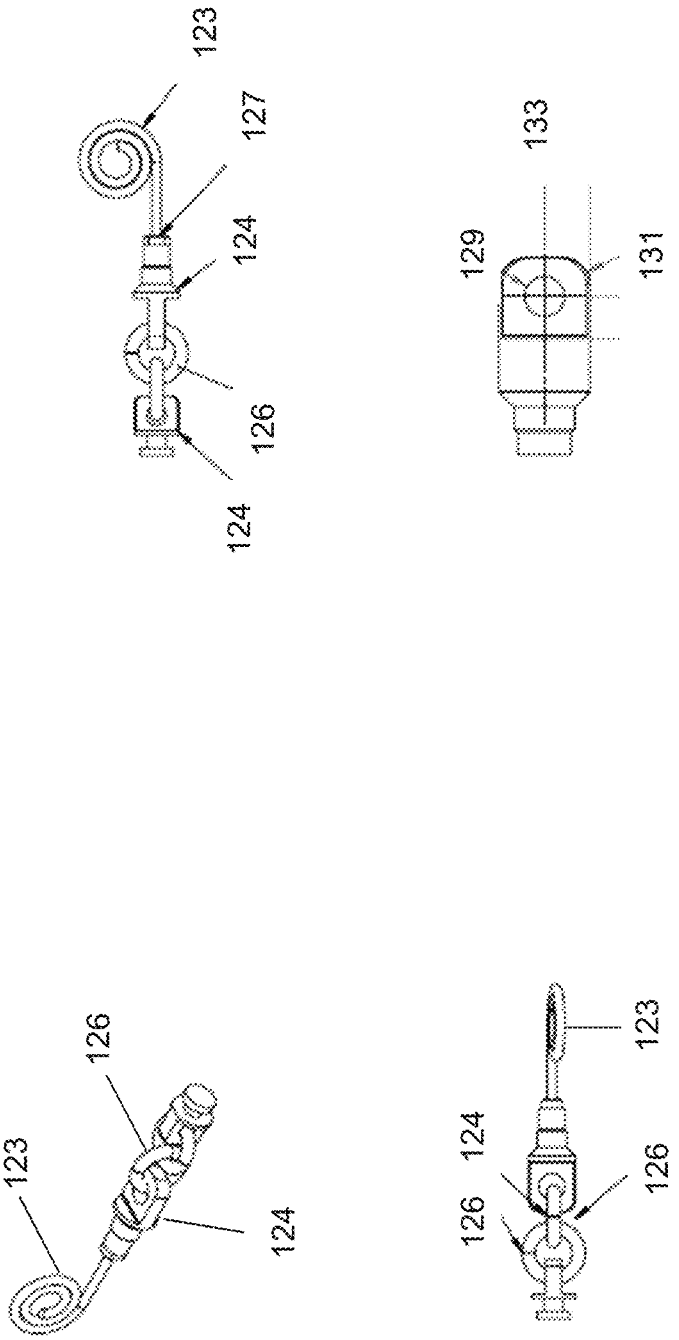
FIG. 12 shows a plurality of views of an embodiment of a cable configuration for spanning between a pair of bracelets according to this disclosure.

FIG. 12 shows a plurality of views of an embodiment of a cable configuration for spanning between a pair of bracelets according to this disclosure. In particular, with reference to FIG. 1, the first bracelet 104 and the second bracelet 106 are coupled via an assembly including the cable 123, the anchor 124, the chain 126, and an element 127, which operates as a rework screw to keep the cable 123 coupled to the anchor 124. Note that the chain 126 can contain one link or two links or more. Further, note that the anchor 124 includes a D-ring 131 defining an opening 129 therein, which is circular, but can vary in shape, such as triangular, pentagonal, or others. The anchor 124 extends along a central axis 133. Moreover, note that the anchor 124 includes metal but can include other materials, such as plastic. Additionally, note that the anchor 124 lacks external sharp edges.

In some embodiments, an orientation of any set of teeth can be reversed or a reduction or an increase of a number of teeth from two to one or two to three can occur, such as in order to modify, such as enhance, a ratcheting action of at least one of the first bracelet 104 or the second bracelet 106.

The restraint device 100 can be used as a handcuff device, a legcuff device, or others to restrain a mammal, such as a human or others, via a first body part thereof, such as via a wrist, an ankle, a neck, a torso, or others, against a second body part thereof, such as via a wrist, an ankle, a neck, a torso, or others, or another mammal, such as a human or others, or an object, such as a pole, a building, a vehicle, or others, whether mobile or stationary. In some embodiments, the restraint device 100 can be configured as a winch, whether manual or powered, or a winch includes at least some components of the restraint device 100.

Figure 13:
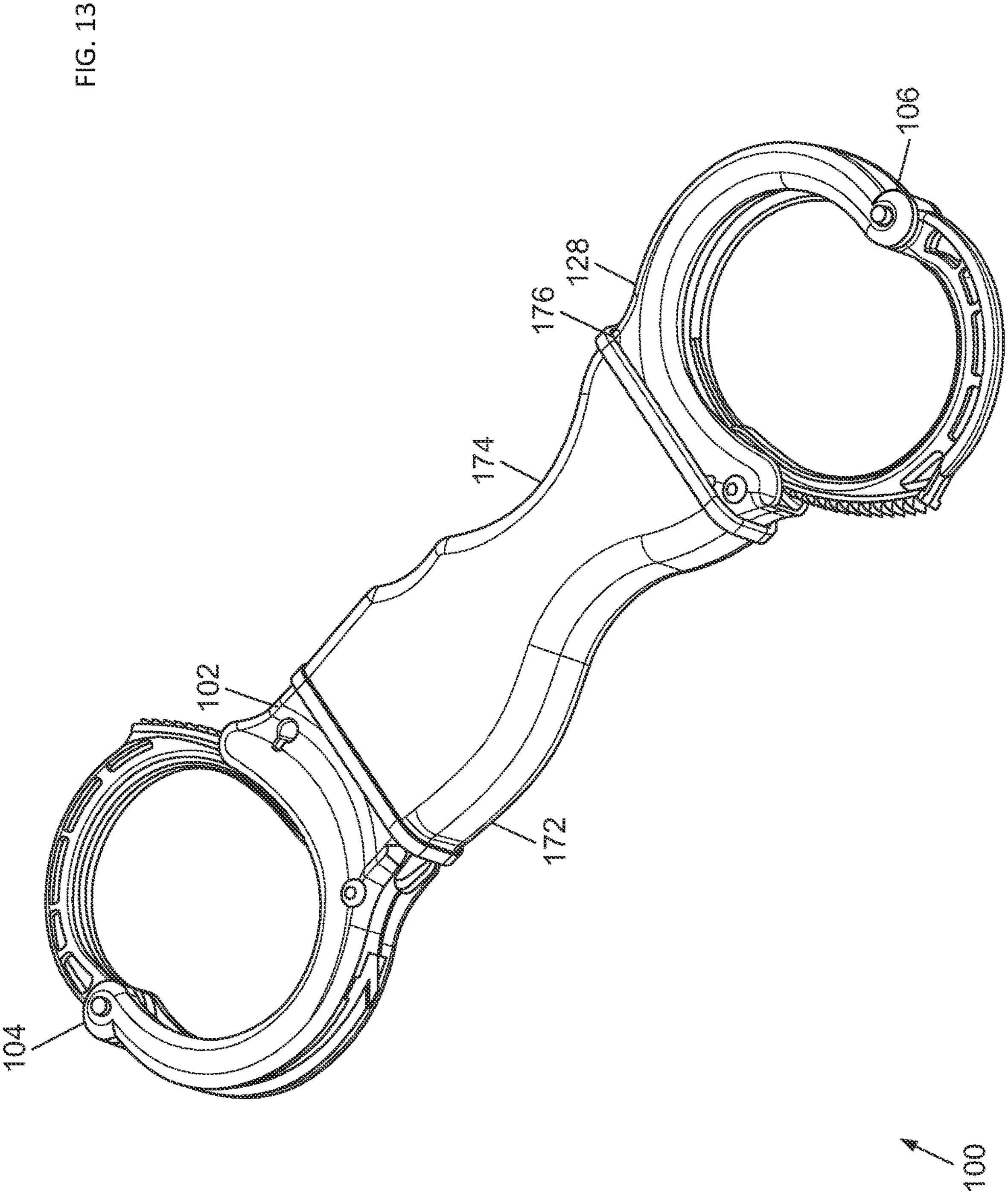
FIG. 13 shows a perspective view of a sleeve engaging a restraint device according to this disclosure.
Figure 14:
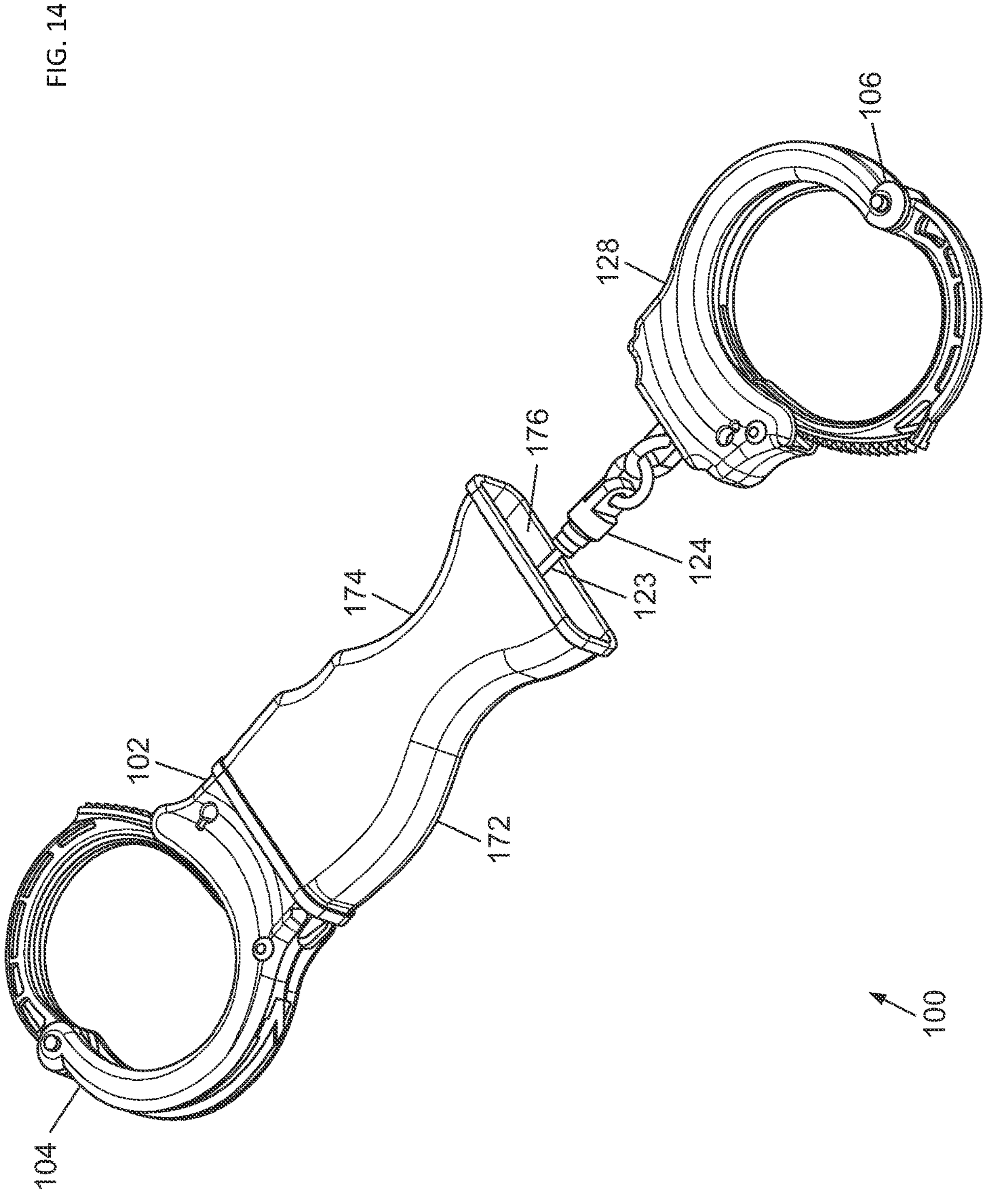
FIG. 14 shows a perspective view of a cable of a restraint device extending through a sleeve according to this disclosure.

FIG. 13 shows a perspective view of a sleeve engaging a restraint device according to this disclosure. FIG. 14 shows a perspective view of a cable of a restraint device extending through a sleeve according to this disclosure. In particular, the restraint device 100 includes a sleeve 172 that is tubular and hour-glass shaped. The sleeve 172 includes a pair of open end portions 176 such that the sleeve 172 tapers away from the pair of open end portions 176 to be hour-glass shaped. As such, the sleeve 172 varies in shape or size longitudinally and laterally, although uniform shape or size is possible as well. For example, the sleeve 172 can be pear shaped, 8-shaped, or shaped in another way, whether rectilinear, sinusoidal, arcuate, pulsating, or others. The sleeve 172 includes a plurality of depressions 174, such as a plurality of wells, that are configured for an engagement with a human hand. However, note that the sleeve 172 can include a plurality of projections, such as a plurality of bumps, that are configured for an engagement with a human hand. Since the sleeve 172 is internally hollow, the pair of open end portions 176 are in fluid communication with each other through the sleeve 172. Note that at least one of the open end portions 176 can mostly open, such as to accommodate a wide-ranging lateral movement of the cable 123. For example, at least one of the open end portions 176 can be mostly open via being open at least 51% of an open terminal area of that respective end. However, note that at least one of the open end portions 176 can be mostly non-open or non-mostly open. Further, note that the sleeve 172 can internally host a wall between the open end portions 176 with an opening sized to accommodate the cable 123. The sleeve 172 includes rubber, but can include plastic, metal, wood, or others. The sleeve 172 is solid, but can be perforated or meshed or include a plurality of scales or a plurality of links. The sleeve 172 is flexible, stretchable, and elastic, but can be rigid. In some embodiments, the sleeve 172 can include an electronic circuit, a sensor, or other form of hardware logic, such as a wireless transceiver or others. For example, the sensor can sense an environmental property, a physical movement, a biometric, or others.

The sleeve 172 spans between the first bracelet 104 and the second bracelet 106. The sleeve 172 is configured to mount onto the first housing 102 and the second housing 128 via the open end portions 176 such that the sleeve 172 is positioned between the first bracelet 104 and the second bracelet 106.

Such mounting can be permanent or temporary, whether snug or non-snug. For example, at least one of the end portions 176 can permanently mount to at least one of the first housing 102 or the second housing 104 via welding, thermal bonding, adhering, or others. For example, at least one of the end portions 176 can temporarily mount to at least one of the first housing 102 or the second housing 128 via fastening, mating (male/female), interlocking, adhering, magnetizing, suction cupping, hook-and-looping, hooking, or others. For example, the sleeve 172 can mount onto at least one of the first housing 102 or the second housing 128 via the open end portions 176 such that the sleeve 172 is not able to rotate, such as inclusively less than about 360 degrees, inclusively less than about 270 degrees, inclusively less than about 180 degrees, inclusively less than about 90 degrees, inclusively less than about 45 degrees, inclusively less than about 30 degrees, inclusively less than about 15 degrees, inclusively less than about 10 degrees, inclusively less than about 5 degrees, or others, including intermediate degree values, with respect to at least one of the first housing 102 or the second housing 128 or vice versa, i.e., at least one of the first housing 102 or the second housing 128 with respect to the sleeve 172. For example, the sleeve 172 can include an about one inch to about two inches of varying diameter butyl rubber tube that is about six inches to about seven inches long. The sleeve 172 is mounted onto the first housing 102 via stretching and onto the second housing 128 when the second bracelet 106 is retracted. When deployed, the sleeve 172 releases the second housing 128 and the cable 123 will pass through one of open end portions 176. In some embodiments, at least one of the first bracelet 104 or the second bracelet 106 is configured as, structured as, or includes the sleeve 172 as an integral component thereof. For example, the first housing 102 can be configured as or structured as the sleeve 172, such as via being tubular, hourglass-shaped or others, configured to accommodate the cable 123, and configured to receive the second housing 128 for mounting thereinto, as disclosed herein.

As such, the sleeve 172 can act as a deterrent for dust and particles to enter the first housing 102 or the second housing 128 when in non-retracted state, as well as an ergonomic comfort grip for a human hand. Further, the sleeve 172 can enable a conversion of the restraint device 100 from being a "chain style" restraint device into a "hinge style" restraint device and vice versa, whether during handcuffing procedure or handcuffing deployment. For example, the sleeve 172 can enable efficient bracelet orientation, without bracelet rotation, when withdrawing from a pouch/holster. For example, the sleeve 172 can enable a self-alignment of the first bracelet 104 and the second bracelet 106 since the sleeve 172 maintains that alignment. Moreover, the sleeve 172 can provide an ergonomic benefit to the first housing 102 or the second housing 128. For example, the sleeve 172 can cover the cable 123 and can provide a stretchy, rubber membrane linking an area where the cable 123 joins the first bracelet 104 and the second bracelet 106. For example, the sleeve 172, by not being permanently affixed to either of the first bracelet 104 and the second bracelet 106, can serve its alignment function without a limitation of a rigid hinge that can eliminate rotation that can be provided by the cable 123. For example, the sleeve 172 can be shaped to provide for alignment without restriction on an orientation of the first bracelet 104 or the second bracelet 106, which can provide for bracelet alignment in whatever orientation desired. Therefore, the sleeve 172 can provide a benefit of a hinge handcuff (automatic alignment) without their foremost limitation (restriction in angle of engagement and range of motion).

Figure 15:
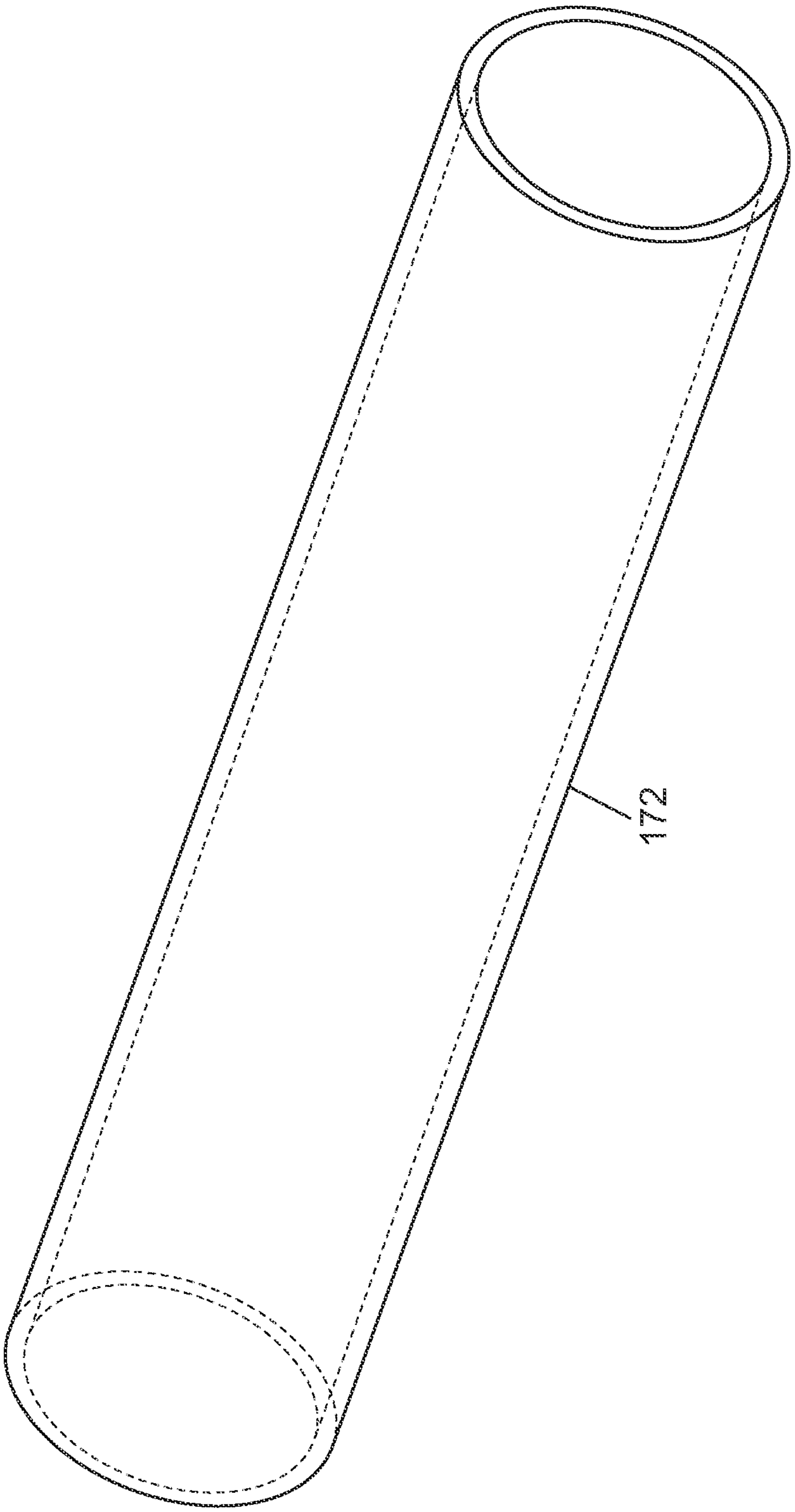
FIG. 15 shows a perspective view of a sleeve according to this disclosure.

FIG. 15 shows a perspective view of a sleeve according to this disclosure. Unlike the sleeve 172 of FIGS. 13-14, this sleeve 172 is circularly uniform in lateral cross-section longitudinally. However, note that other shapes are possible, such as triangular, square, pentagonal, rectangular, octagonal, star, crescent, cross, or any other closed shape polygon, whether uniform or non-uniform in lateral cross-section longitudinally.

Figure 16:
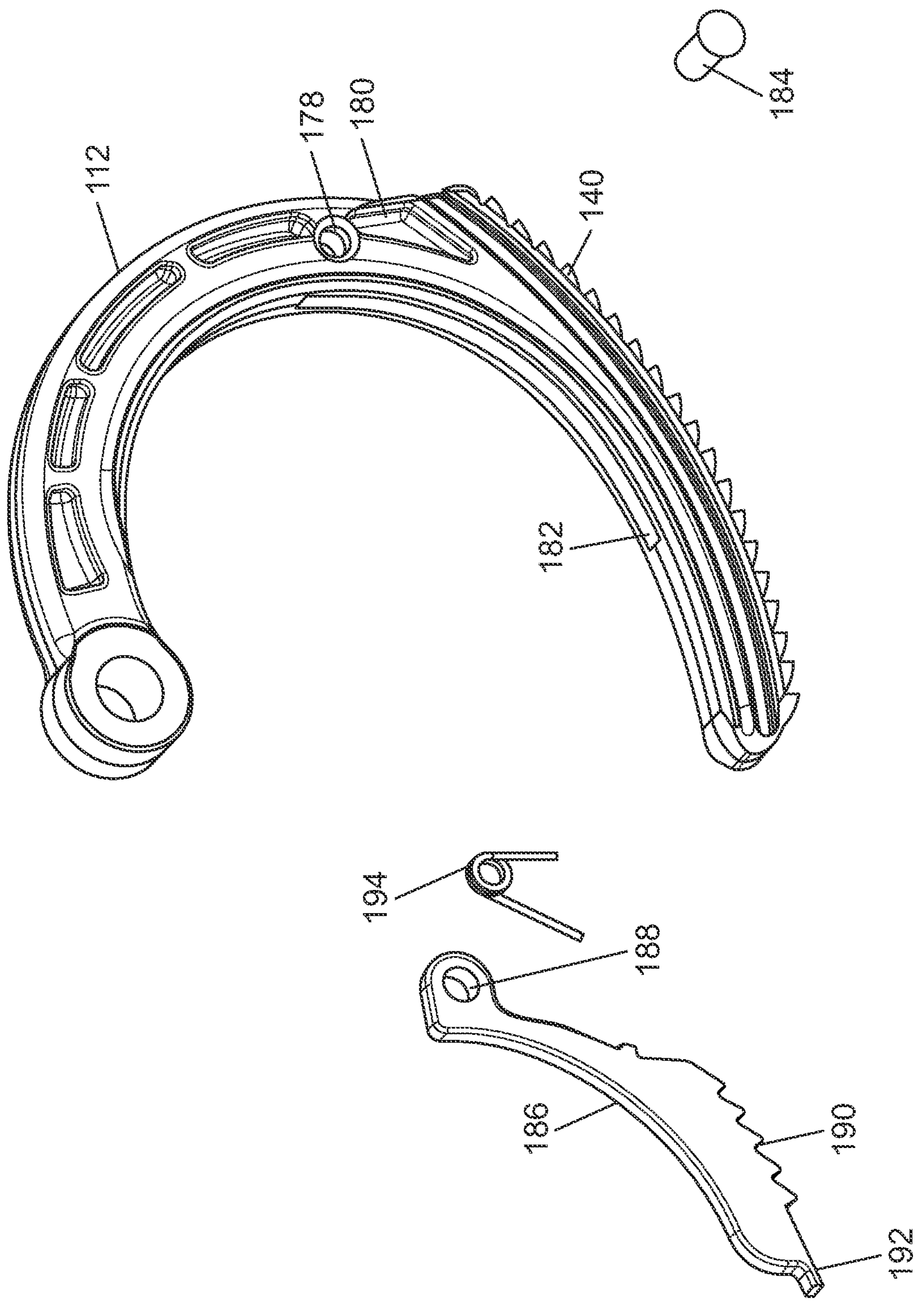
FIGS. 16-34 show a plurality of various views of a first arm elastically coupled to a second arm to reduce overtightening according to this disclosure.

FIGS. 16-34 show a plurality of various views of a first arm elastically coupled to a second arm to reduce overtightening according to this disclosure. In particular, FIG. 16 shows an exploded view of the first arm 112 that includes the set of teeth 140. Although the first arm 112 is described in context of the first bracelet 104, this technology can also be similarly implemented in the second bracelet 106. The first arm 112 also defines a cavity 178 extending laterally thereinto, a seat 180 extending laterally thereinto, and a cavity 182 laterally extending thereinto. The cavity 178, the seat 180, or the cavity 182 can be a well or a channel extending fully therethrough. The cavity 178 is shaped annularly, but can be shaped differently, such as oval, D-shape, or others. The seat 180 is V-shaped, but can be shaped differently, such as W-shaped, M-shaped, N-shaped, O-shaped, X-shaped, U-shaped, or others. The cavity 182 is shaped rectangularly, but can be shaped differently, such as square, oval, triangular, or others. The cavity 178, the seat 180, or the cavity 182 can be internally smooth or rough.

The cavity 178 is sized to receive a pin 184, such as for riveting to the first housing 102 or the second housing 128. The pin 184 includes a rectilinear stem, although the stem can be non-rectilinear, such as arcuate, sinusoidal, or others. The pin 184 can include a head extending from the stem, with the head being unitary with the stem, such as via casting, molding, or others, or assembled with the stem, such as via fastening, mating, adhering, or others. The pin 184 is smooth, but can be rough or threaded or spiked. The pin 184 includes metal, but can include other materials, such as plastic, rubber, wood, or others.

The first arm 112 is configured to host a third arm 186 that extends in an arcuate manner, such as to conform or accommodate a human wrist or others. However, note that the third arm 186 can extend in other ways, such as rectilinear, sinusoidal, or others. The third arm 186 includes metal, but can include other materials, such as plastic, rubber, wood, or others. The third arm 186 has a first longitudinal end portion and a second longitudinal end portion, with the first longitudinal end portion opposing the second longitudinal end portion. The first longitudinal end portion defines a cavity 188 extending laterally thereinto. The cavity 188 is sized to host the pin 184. The cavity 188 can be a well or a channel extending fully therethrough. The cavity 188 is shaped annularly, but can be shaped differently, such as oval, D-shape, or others. The cavity 188 can be internally smooth or rough. The second longitudinal end portion defines a tail 192 extending therefrom in a cantilevered manner. The tail 192 is unitary to the third arm 186, but can be assembled therewith, such as via fastening, mating, adhering, or others. The third arm 186 hosts a set of teeth 190 between the first longitudinal end portion and the second longitudinal end portion and between the cavity 188 and the tail 192. Note that the set of teeth 140 and the set of teeth 190 are arranged for meshing in opposite directions.

The seat 180 is configured to host a spring 194, which can include a helical spring, a non-helical spring, a torsion spring, or others. Note that the spring 194 can include or be substituted with a foam member, an elastic plug, a resilient piece, or others. The seat 180 can host the spring 194 snugly, although non-snug hosting is possible. When seated in the seat 180, the spring 194 engages the first arm 112 and the third arm 186, such as via contact or others. For example, the spring 194 can engage the third arm 186 between the first longitudinal end portion and the second longitudinal end portion and between the cavity 188 and the tail 192. For example, the spring 194 can engage against the first longitudinal end portion such that the spring 194 contacts the third arm 186 between the cavity 194 and the tail 192.

Figure 17:
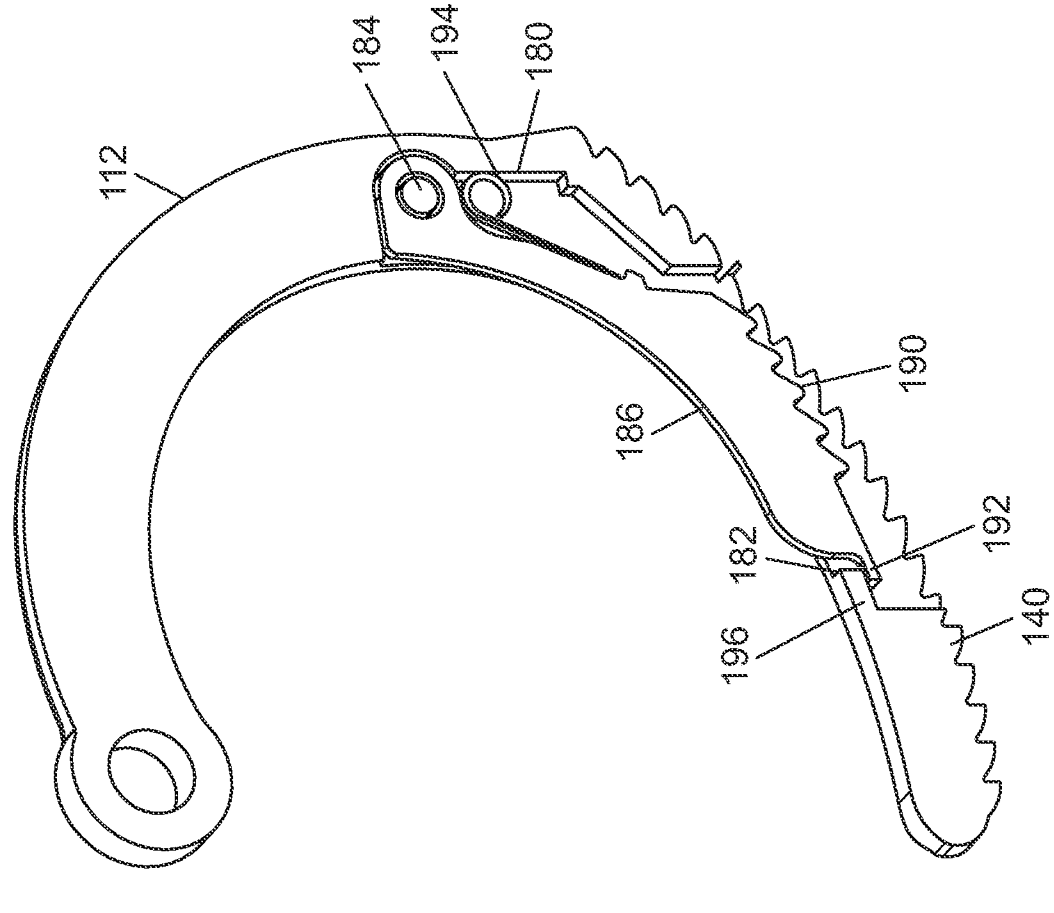

As shown in FIG. 17, the seat 180 seats the spring 194 such that the spring 194 engages the first arm 112 and the third arm 186, as the spring 194 is positioned between the pin 184, as the pin 184 extends through the cavity 178, and the set of teeth 140. Note that the set of teeth 140 and the set of teeth 190 are arranged for meshing in opposite directions. The first arm 112 includes a ledge 196 that engages, such as via contact or others, the tail 192 when the spring 194 is not compressed, such via the spring 194 being in a default position, although a vice versa configuration is possible, such as when the spring 194 is compressed.

Figure 18:
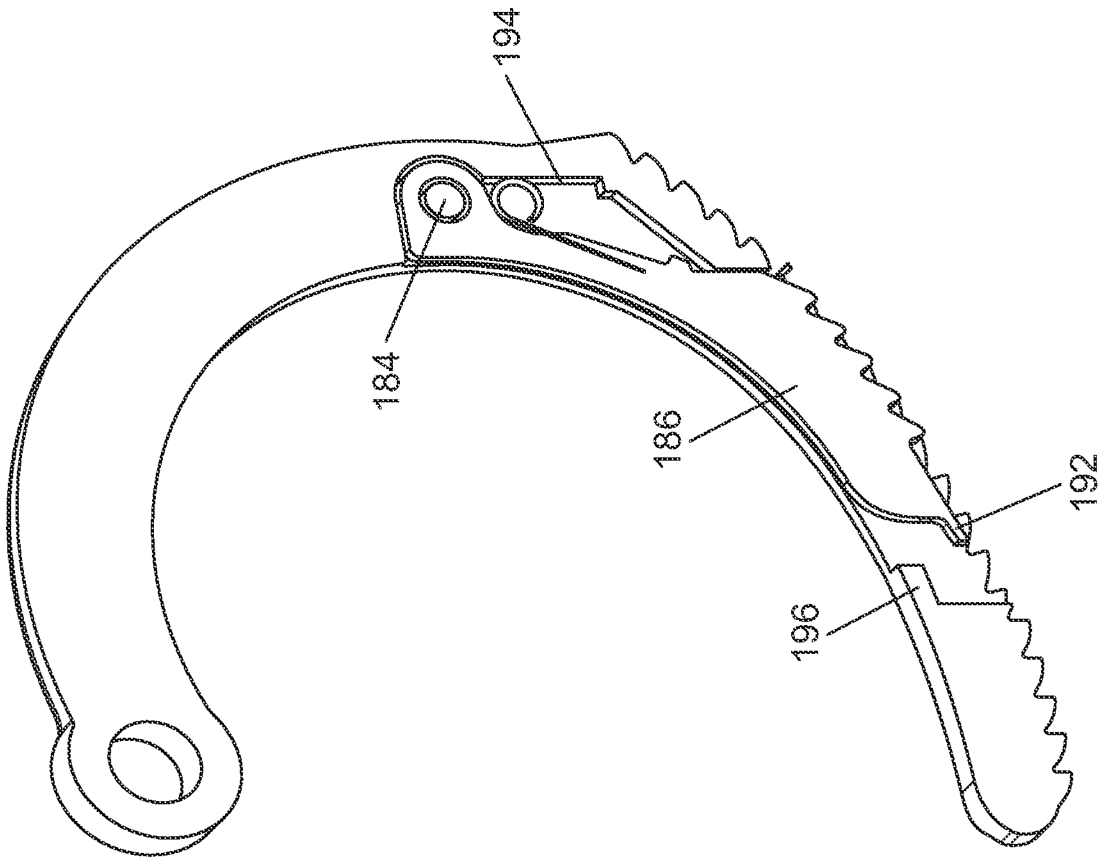
Figure 19:
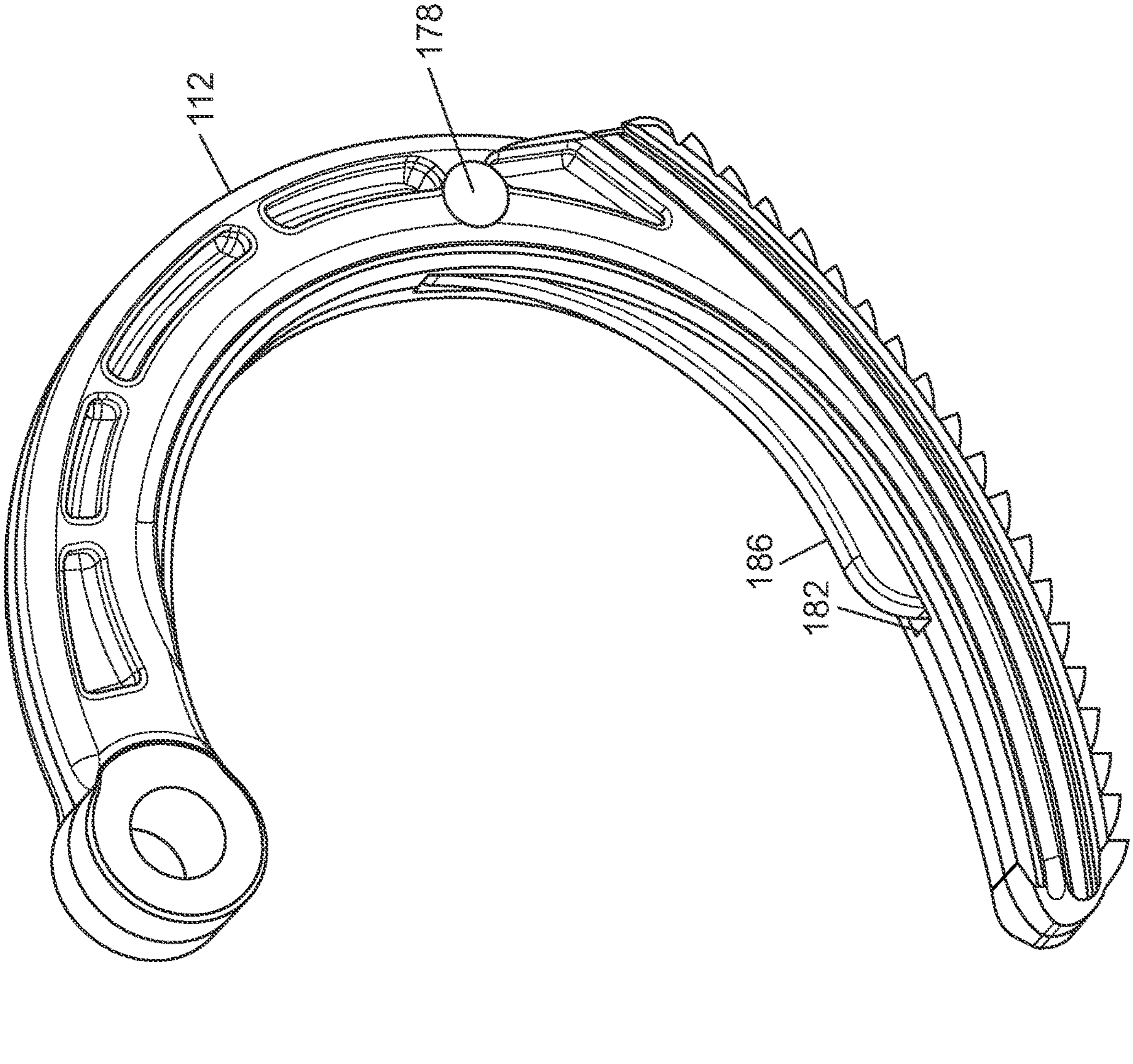
Figure 20:
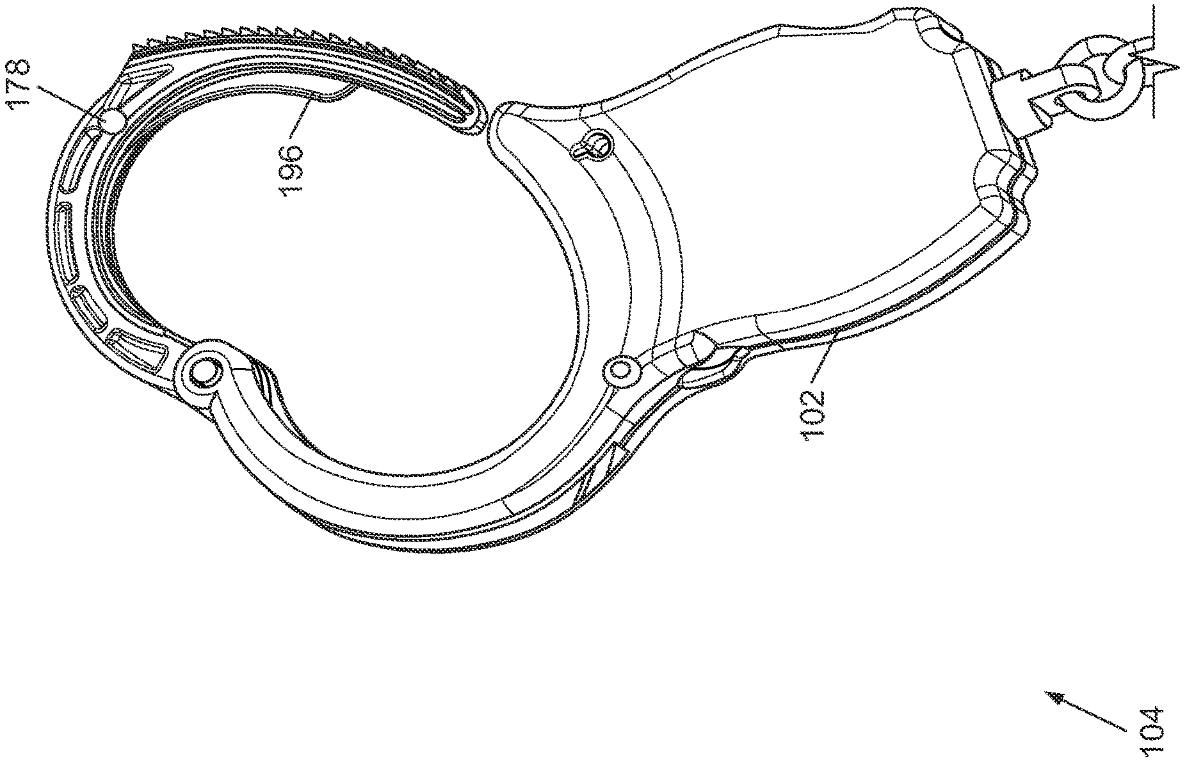
Figure 21:
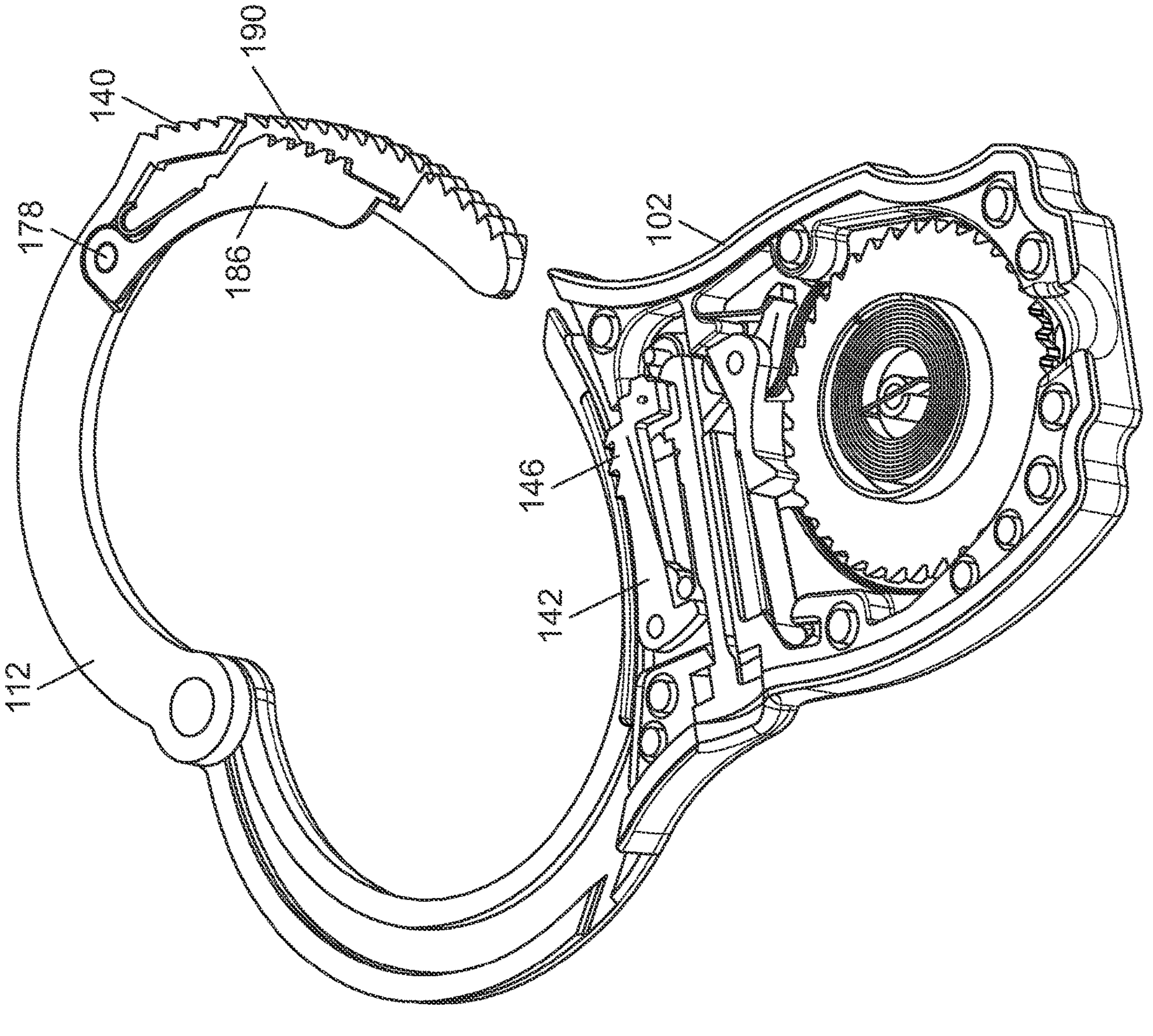

In contrast, as shown in FIG. 18, when the spring 194 is compressed, such as into a non-default position, such as via the third arm 186 contacting a human wrist or others and thereby urging the spring 194 to compress, the third arm 186 pivots about the pin 184 such the tail 192 moves away from the ledge 196 and such that an air gap is formed between the ledge 196 and the tail 192. In some embodiments, the third arm 186 is pivotally coupled to the first arm 112 via a pair of horns, which can be co-aligned, rigid, rectilinear, arcuate, or sinusoidal, extending from the third arm 186 in directions opposite from each other into a pair of cavities, as disclosed above, in the first arm 112. In some embodiments, the third arm 186 is pivotally coupled to the first arm 112 via a pair of horns, which can be co-aligned, rigid, rectilinear, arcuate, or sinusoidal, extending from the first arm 112 toward each other into a pair of cavities, as disclosed above, in the third arm 186. In some embodiments, the ledge 196 engages the tail 192 when the spring 194 is in a compressed position and disengages the tail 192 when the spring 194 is in a non-compressed position.

Figure 22:
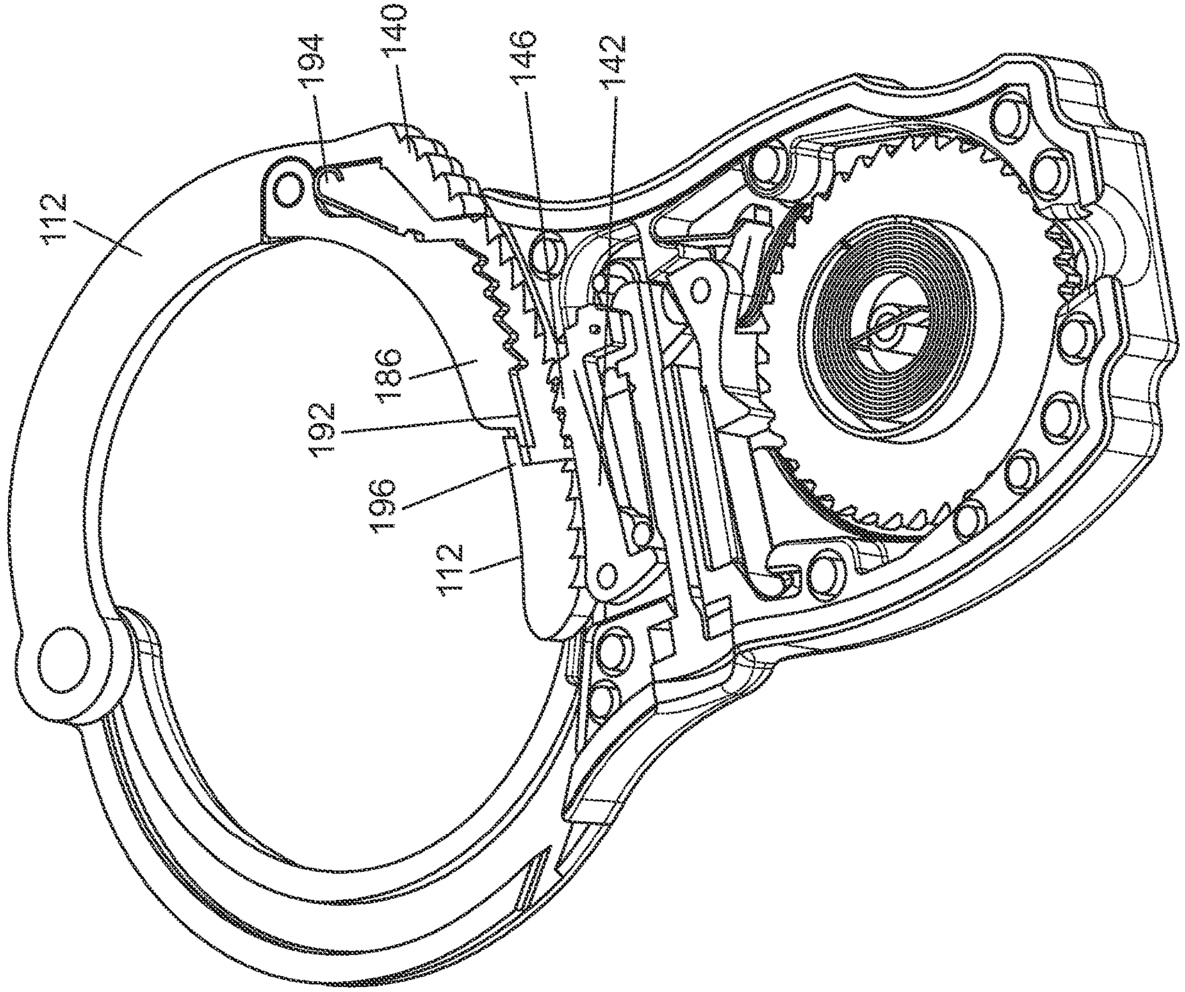
Figure 23:
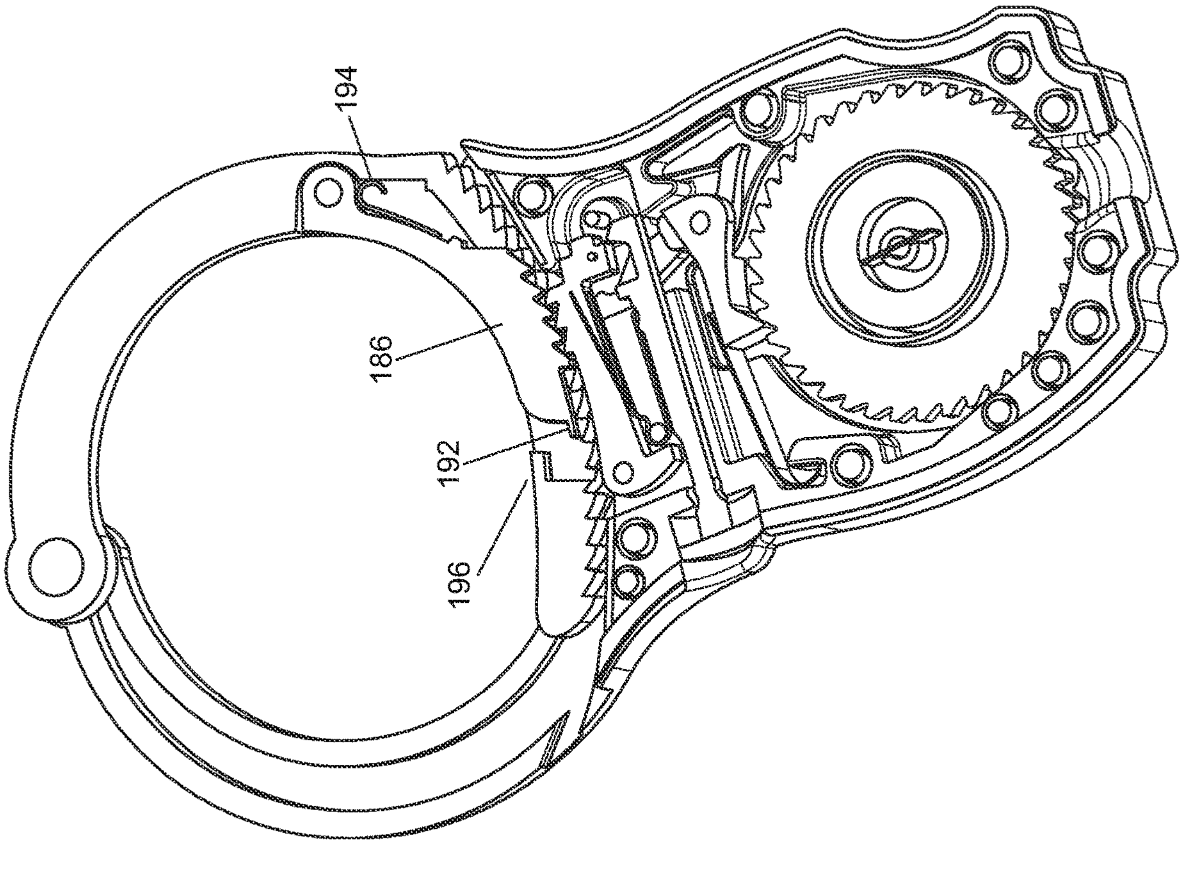
Figure 24:
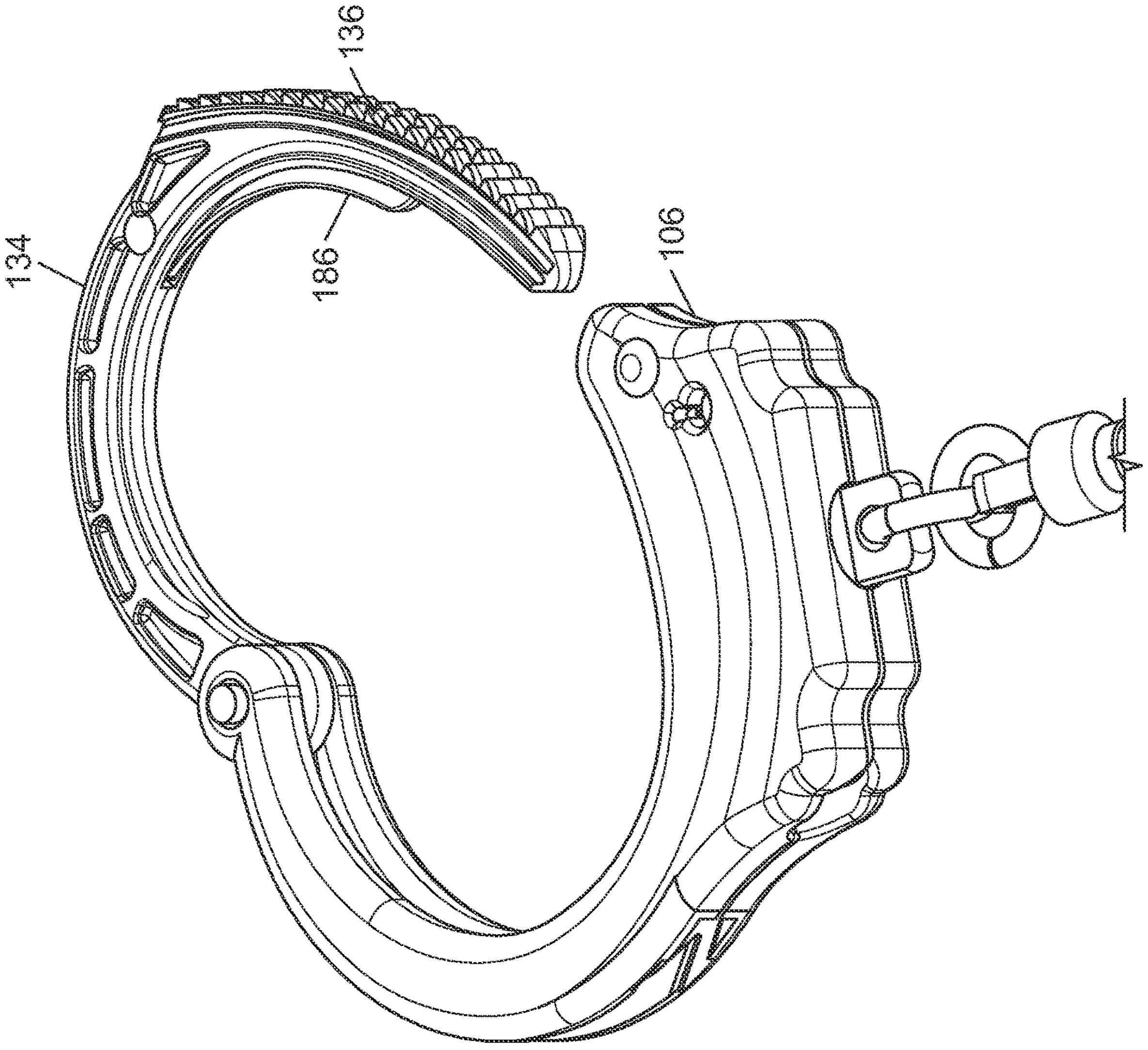
Figure 25:
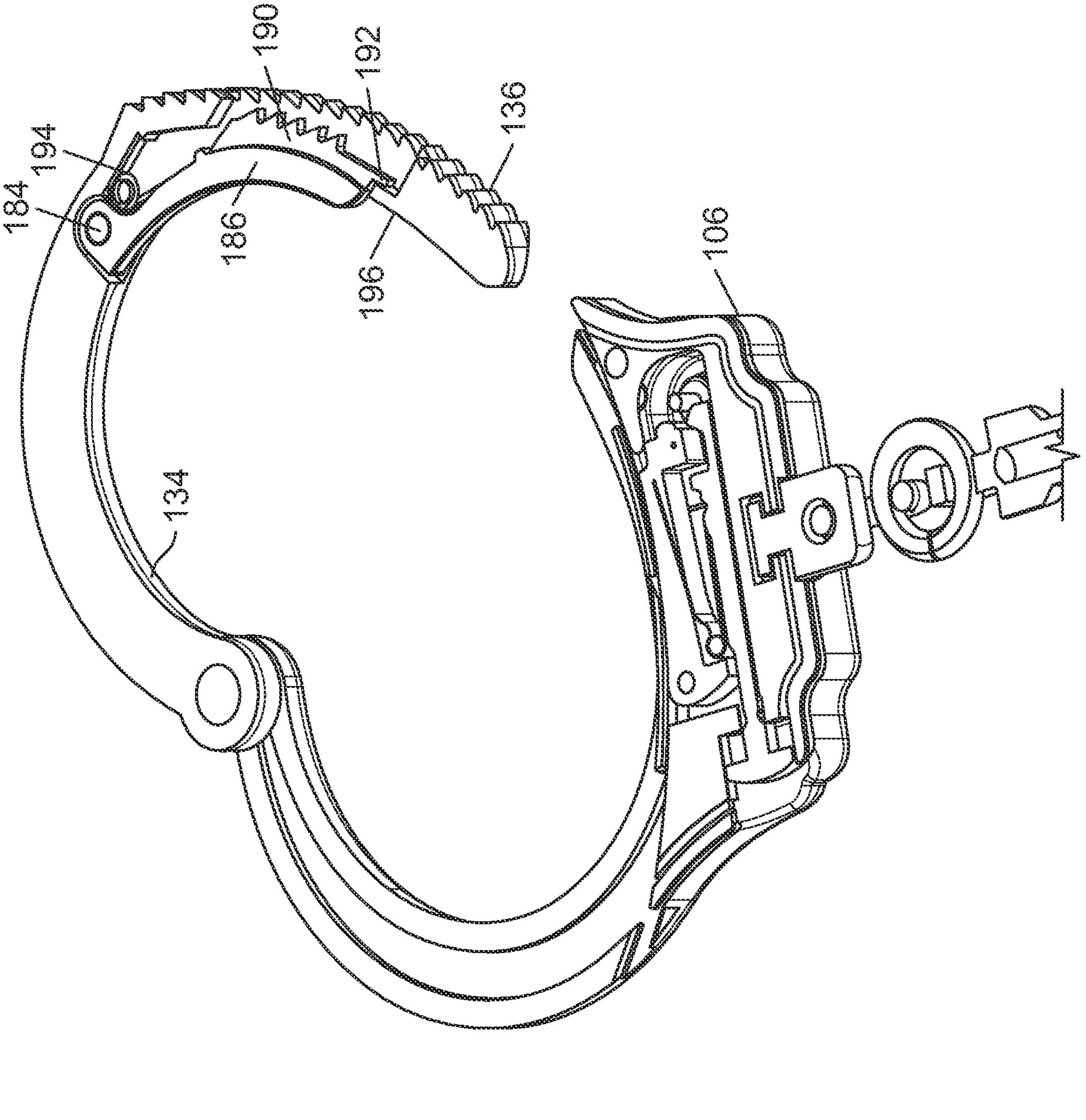
Figure 26:
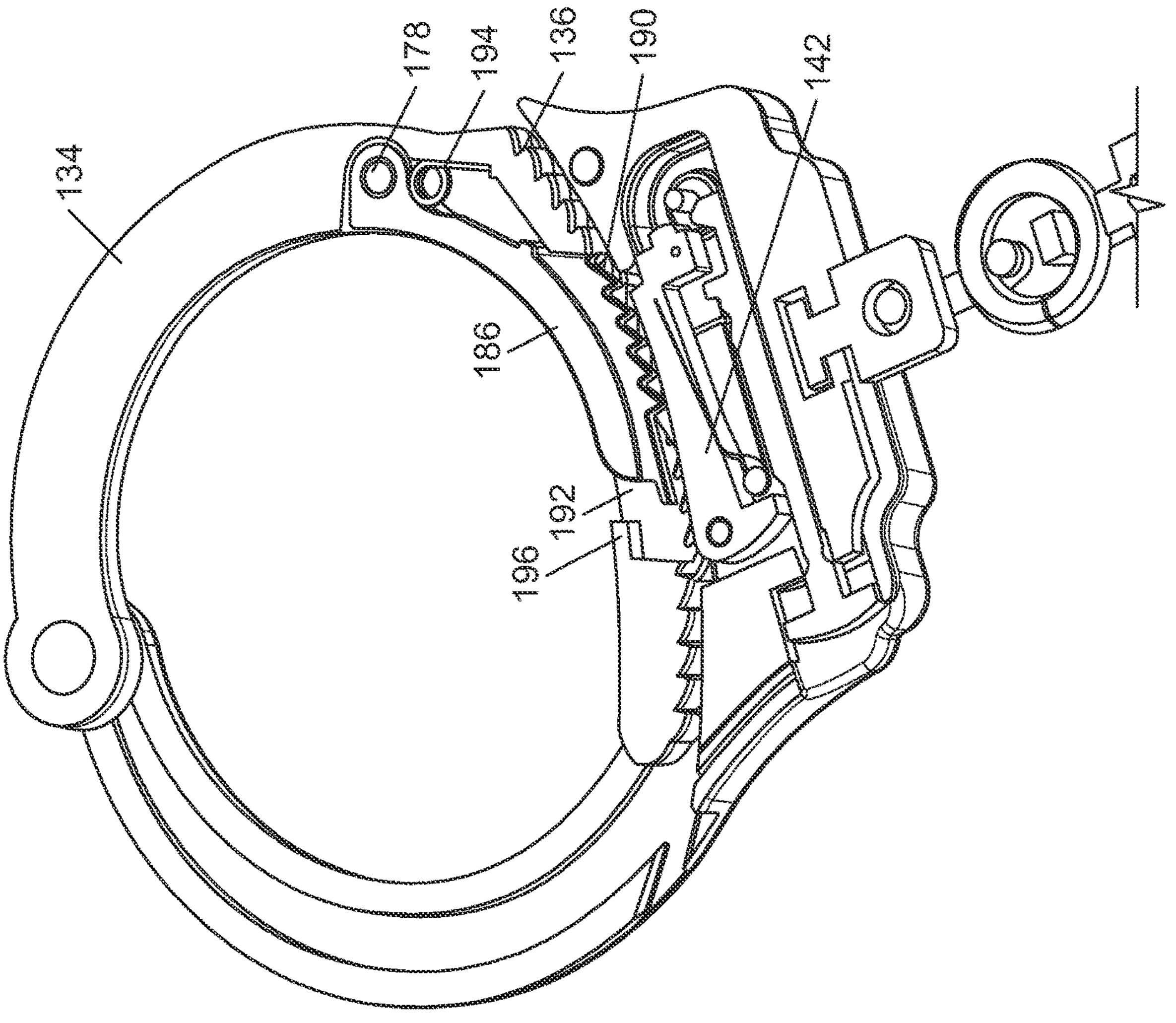
Figure 27:
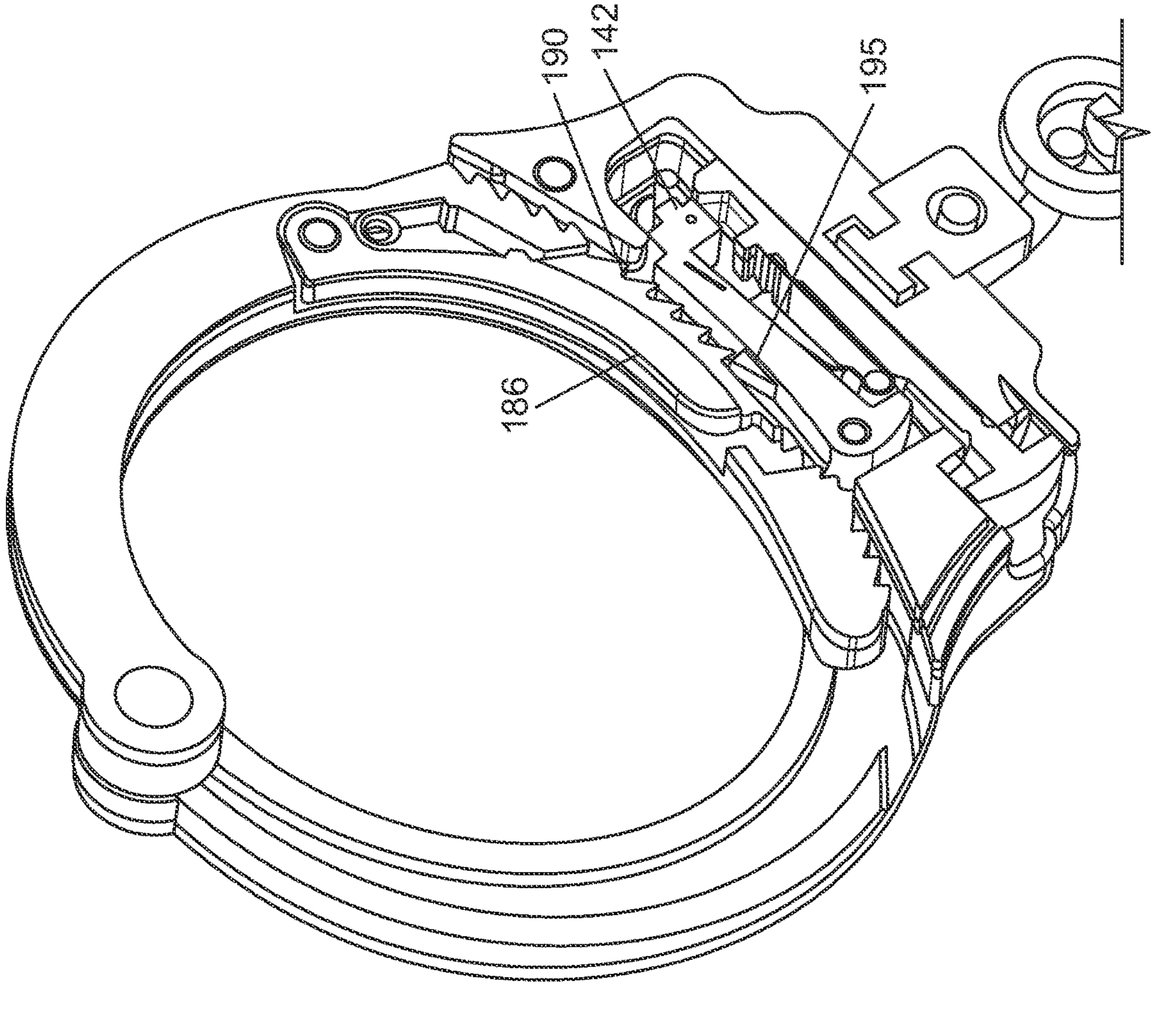

As shown in FIG. 22, the set of teeth 146 of the first bar 142 meshes with the set of teeth 140 of the first arm 112, as the tail 192 contacts the ledge 196 based on the spring 194 not being compressed, although a vice versa embodiment is possible, as disclosed above. Note that the third arm 186 extends out of the cavity 182 when the spring 194 is not compressed, although a vice versa embodiment is possible, as disclosed above. In contrast, as shown in FIG. 23, the spring 194 is compressed, such when the third arm 186 contacts a human wrist or others and thereby urges the spring 194 to compress or vice versa, and the third arm 186 pivots via the pin 184 with respect to the first arm 112 such that the tail 192 moves away from the ledge 196 and an air gap is formed therebetween and the third arm 186 is pressed into the cavity 182 towards the set of teeth 140. At that time, the set of teeth 190 engages the first bar 142, as further explained below.

As shown in FIGS. 27 and 29-34, the first bar 142 includes a set of teeth 195 that are configured to mesh with the set of teeth 190 on the third arm 186. Therefore, the first bar 142 includes the set of teeth 146 and the set of teeth 195. Note that the set of teeth 146 and the set of teeth 195 are arranged for meshing in opposite directions. Resultantly, the set of teeth 146 meshes with the set of teeth 140 and the set of teeth 195 meshes with the set of teeth 190 when the spring 194 is compressed or vice versa, such as via the third arm 186 contacting a human wrist or others and thereby urging the spring 194 to compress or vice versa, and the third arm 186 pivoting about the pin 184 with respect to the first arm 112 such that the tail 192 moves away from the ledge 196 toward the first bar 142 and does not contact the ledge 196 and such that an air gap between the ledge 196 and the tail 192 is formed.

Note that the first arm 112 can host at least one row of the set of teeth 140, which can be positioned longitudinally along, in parallel, and adjacent to the set of teeth 190 of the third arm 186, such as when the spring 194 is compressed or non-compressed. For example, as shown in FIGS. 29-34, the first arm 112 hosts two rows of the set of teeth 140, both of which mesh with two rows of the set of teeth 146 on the first bar 140. In some embodiments, more than two rows of the set of teeth 140 and the set of teeth 146 can be used. Likewise, since the third arm 186 is pivotally hosted via the pin 184 on the first arm 112, the set of teeth 190 is interposed between the two rows of the set of teeth 140, such as when the spring 194 is compressed or non-compressed. Note that when more than two rows of the set of teeth 140 or the set of teeth 146 are used, then the set of teeth 190 or the set of teeth 195 can be used, such as via alternating between the two rows of the set of teeth 140 or the set of teeth 146.

Figure 28:
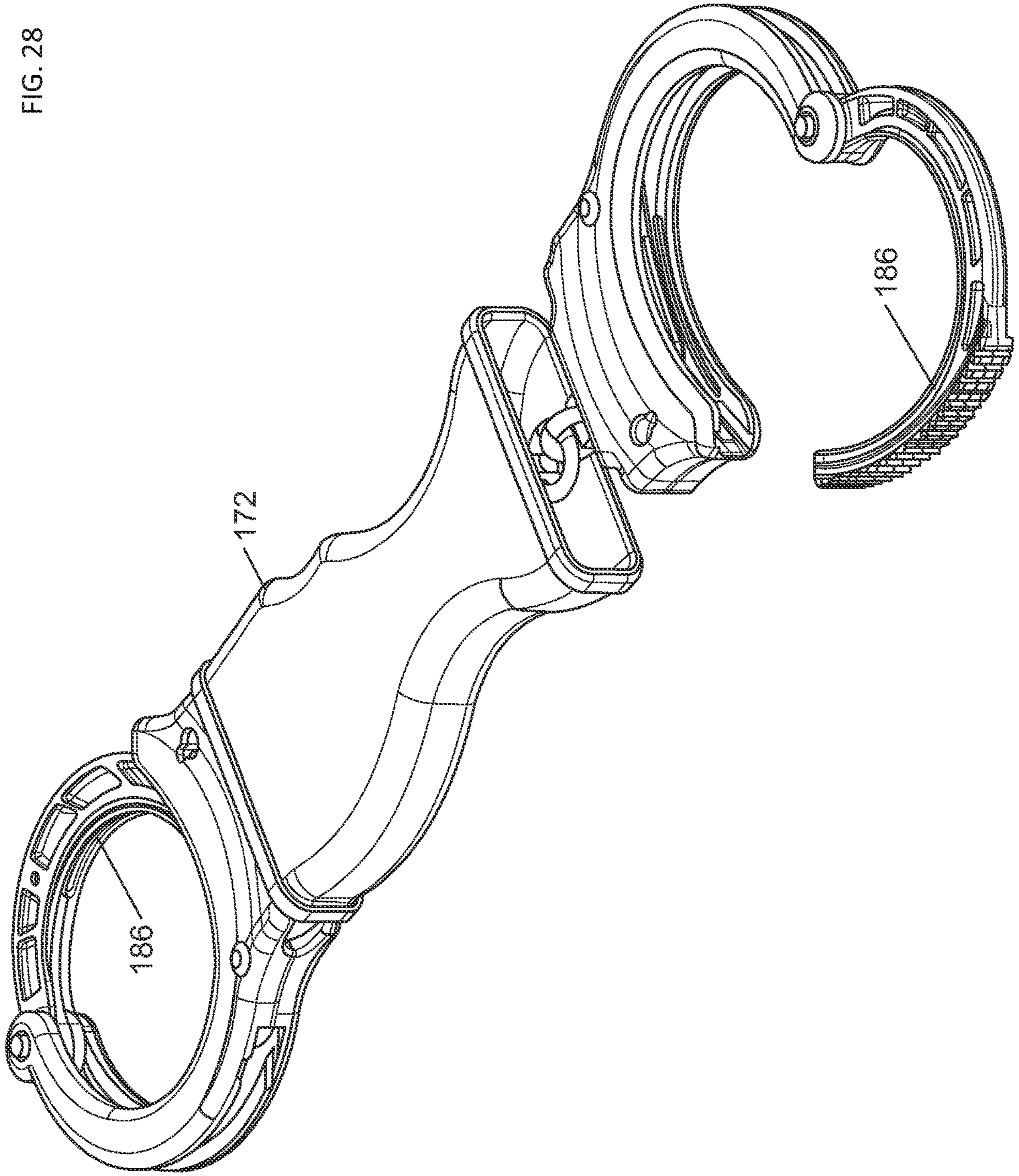
Figure 29:
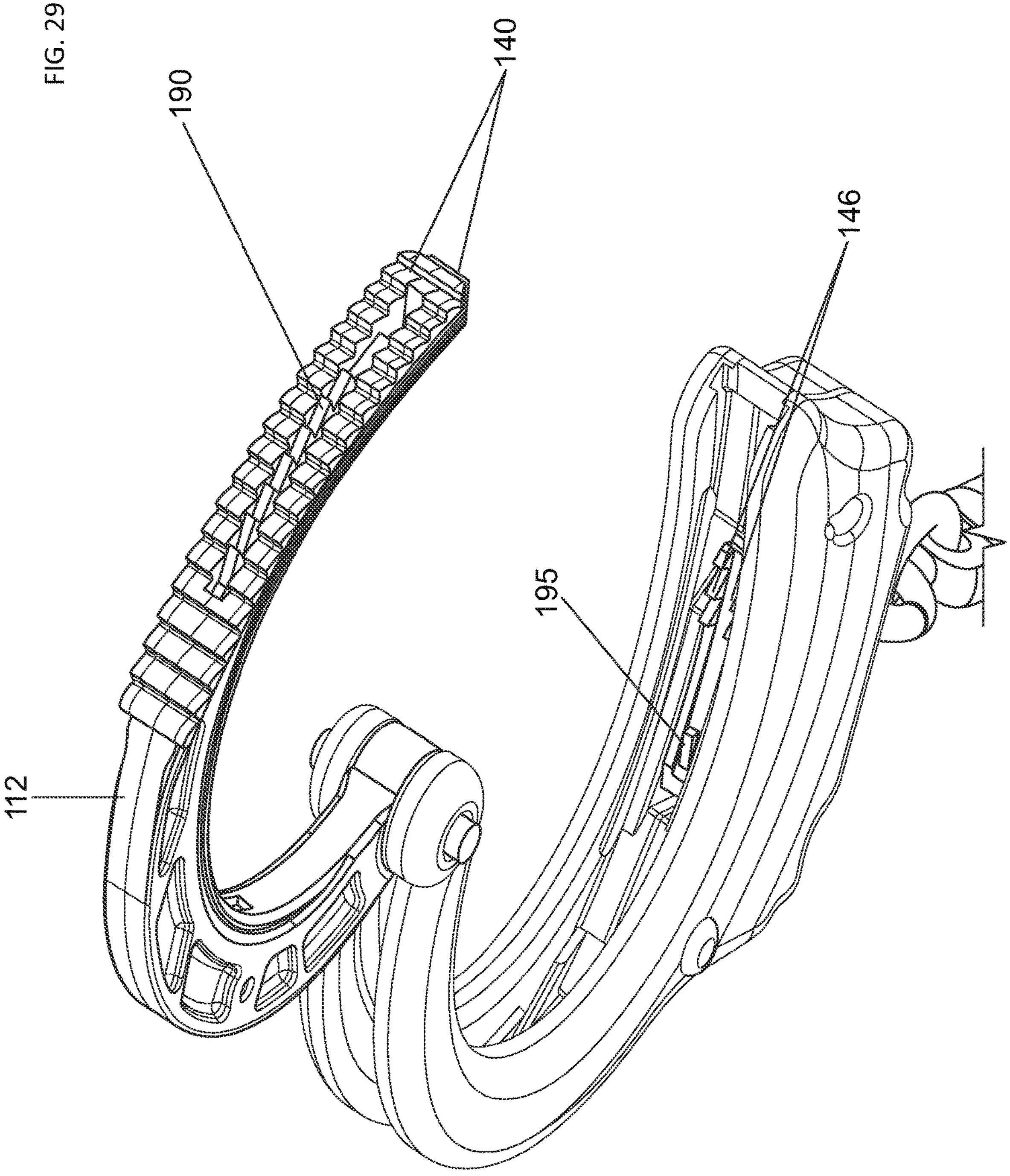
Figure 30:
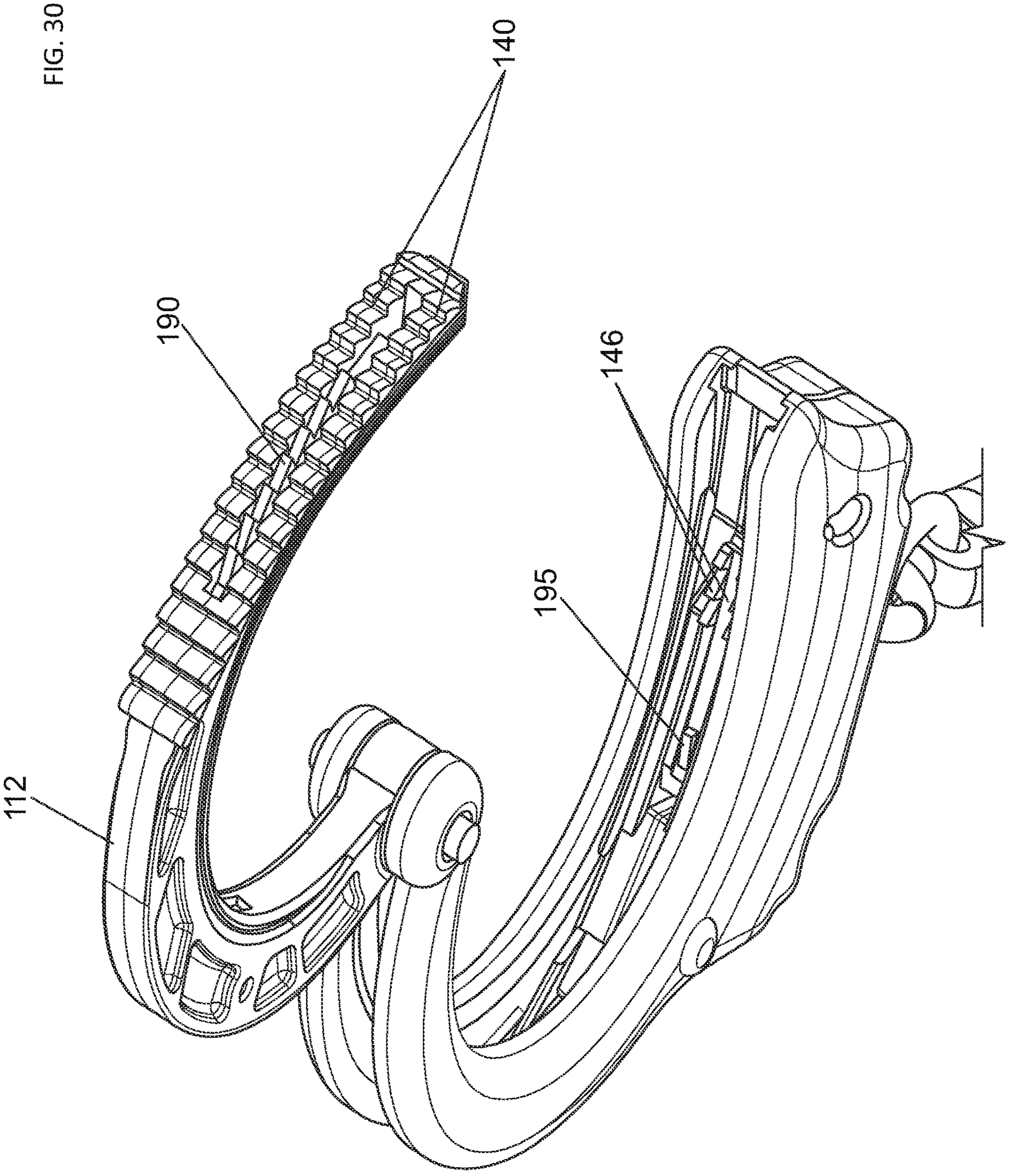
Figure 31:
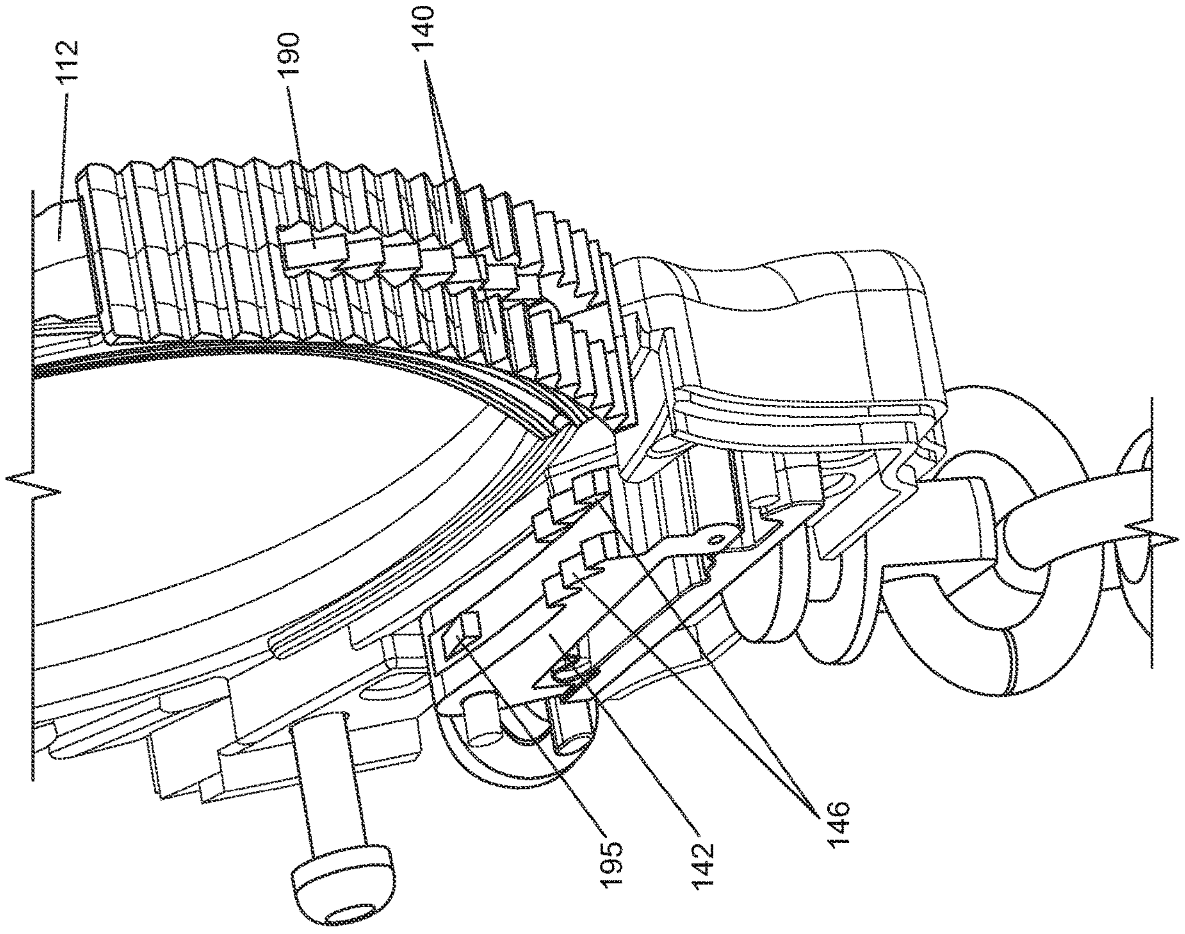
Figure 32:
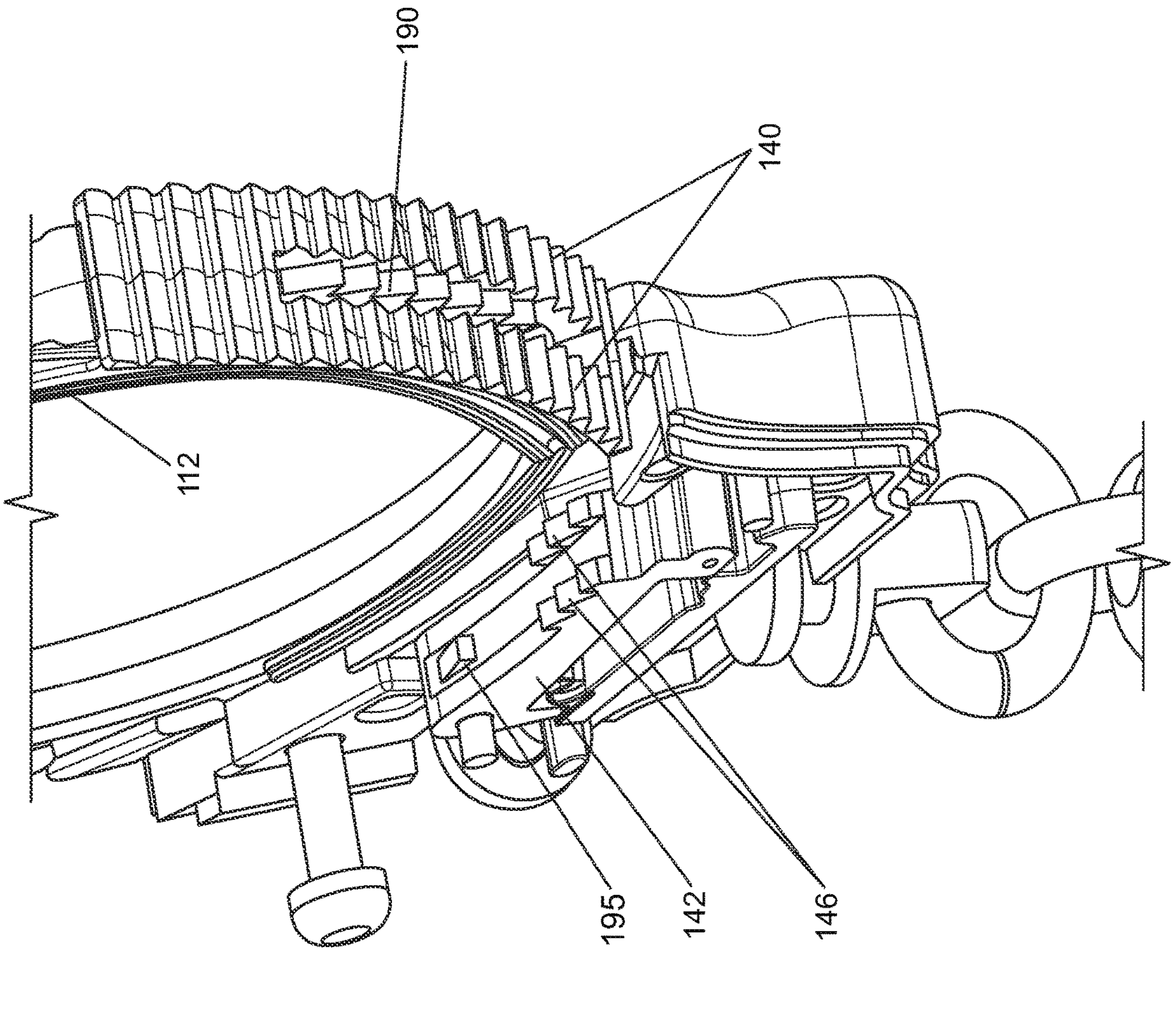
Figure 33:
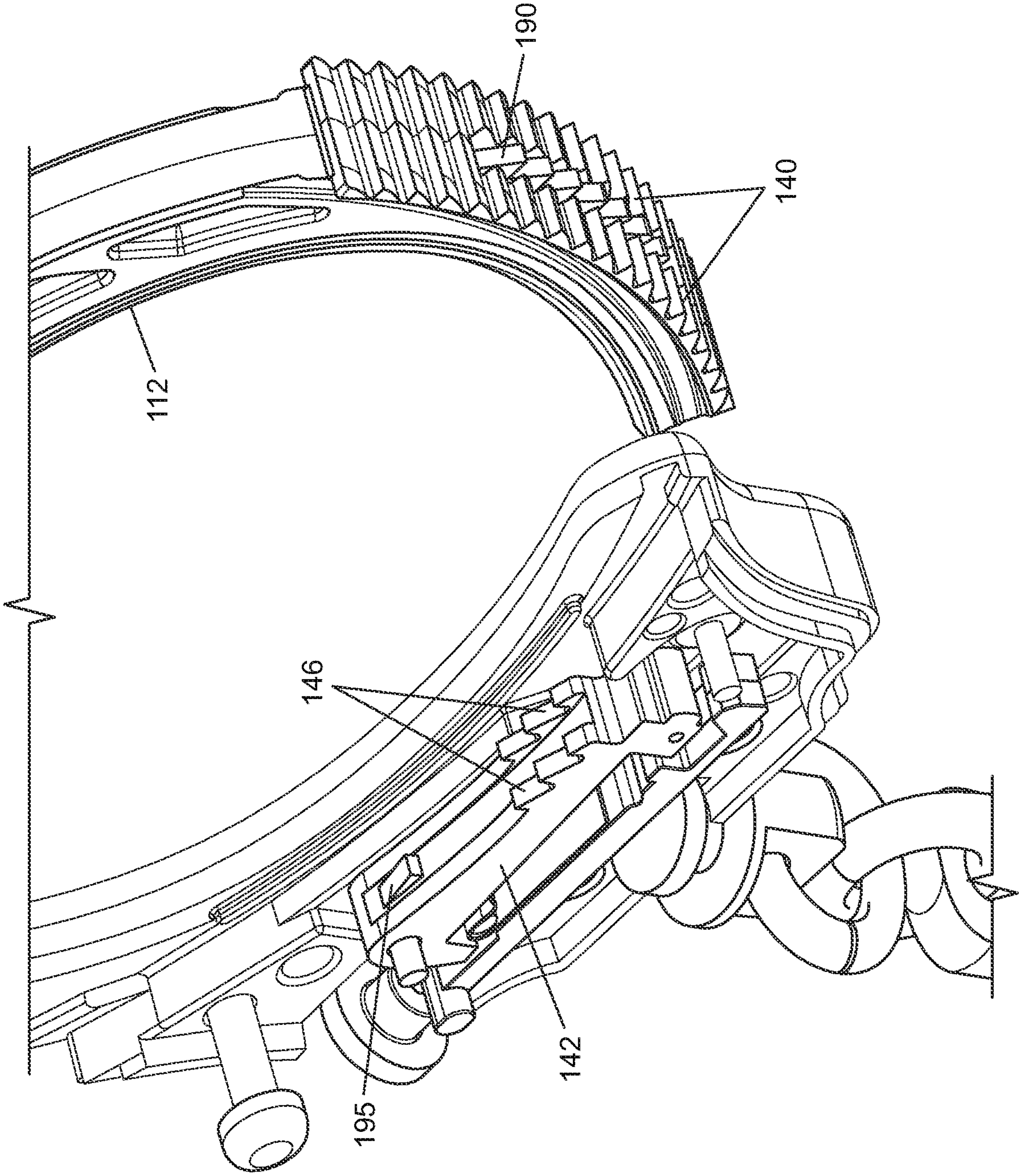
Figure 34:
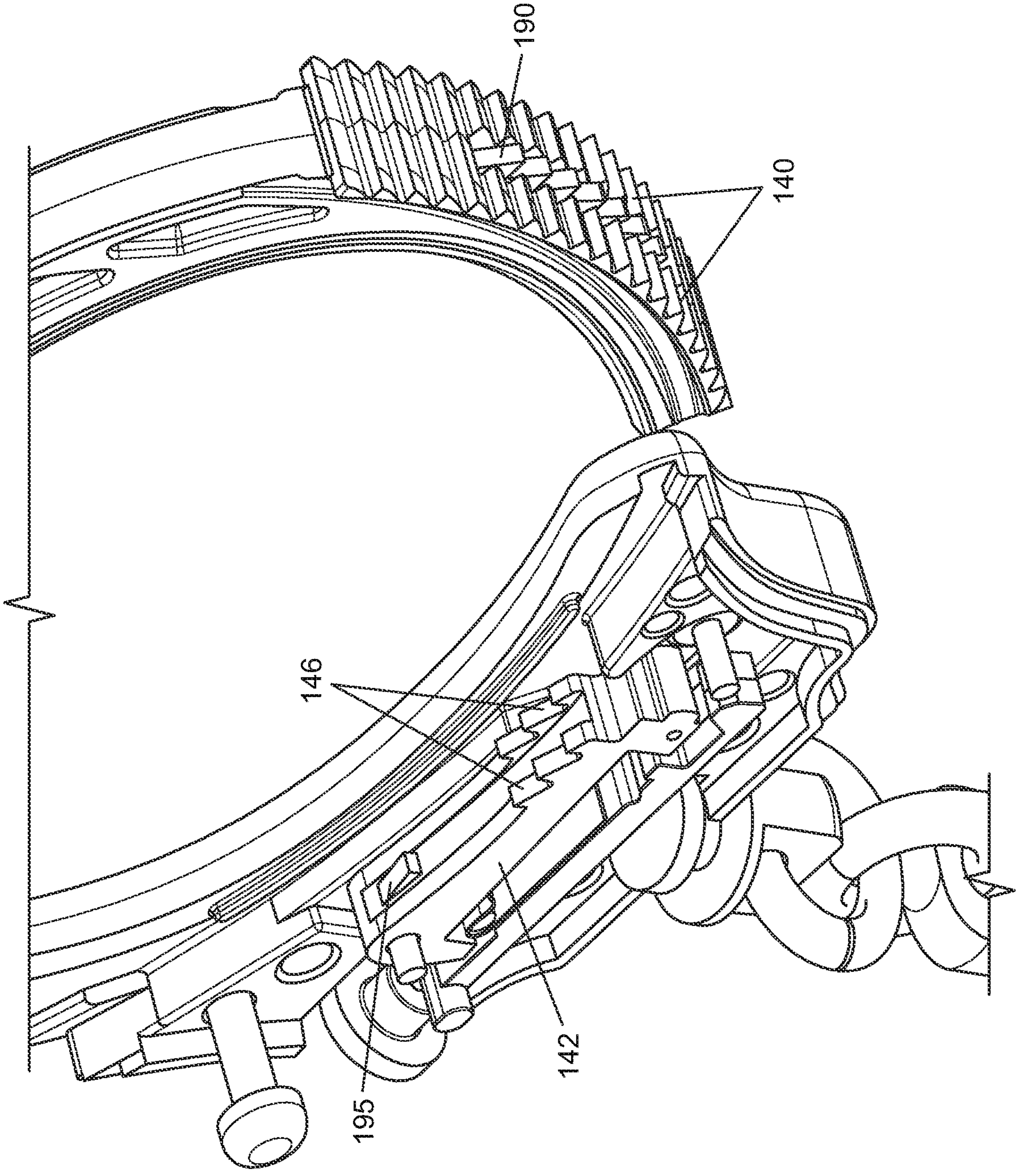

As shown in FIG. 28, the third arm 186 can be used as the sleeve 172 spans between the first bracelet 104 and the second bracelet 106. The sleeve 172 is configured to mount onto the first housing 102 and the second housing 128 via the open end portions 176 such that the sleeve 172 is positioned between the first bracelet 104 and the second bracelet 106.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Various corresponding structures, materials, acts, and equivalents of all means or step plus function elements in various claims below are intended to include any structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A restraint device comprising:
a first bracelet including a first housing and a reel, wherein the reel hosts a cable;
a second bracelet including a second housing, wherein the cable is coupled to the second housing; and
a sleeve configured to be slidably mounted onto the first housing and the second housing such that the cable extends through the sleeve while the sleeve extends between the first housing and the second housing and the sleeve is hollow, flexible, unitary, and substantially hour-glass shaped.

2. The restraint device of claim 1, wherein the sleeve includes rubber.

3. The restraint device of claim 1, wherein the sleeve is fully solid end-to-end.

4. The restraint device of claim 1, wherein the sleeve is stretchable.

5. The restraint device of claim 1, wherein the sleeve is permanently substantially hour-glass shaped.

6. The restraint device of claim 1, wherein the first bracelet is a first handcuff and the second bracelet is a second handcuff.

7. The restraint device of claim 1, wherein the sleeve includes a depression configured for an engagement with a human hand.

8. The restraint device of claim 1, wherein the first bracelet includes:
an arm coupled to the first housing pivotally, wherein the arm includes a first set of teeth;
a first bar housed within the first housing pivotally, wherein the first bar includes a second set of teeth and a projection;
a second bar housed within the first housing such that the second bar is configured to travel between a first position and a second position, wherein the second bar includes a depression configured to enclose the projection as the second bar is in the first position such that the second set of teeth disengages the first set of teeth, wherein the depression is configured not to enclose the projection as the second bar is in the second position such that the second set of teeth engages the first set of teeth;
a first spring housed within the first housing, wherein the first spring engages the first bar and the second bar;
a second spring housed within the first housing, wherein the reel includes a third set of teeth; and
a pivot housed within the first housing such that the pivot rotates between a third position and a fourth position, wherein the pivot hosts a first extension, a second extension, and a third extension, wherein the first extension engages at least one tooth of the first set of teeth as the second set of teeth engages the first set of teeth and the second extension engages at least one tooth of the third set of teeth when the pivot is in the third position, wherein the first extension avoids engaging the first set of teeth as the second set of teeth avoid engaging the first set of teeth and the second extension avoids engaging the third set of teeth when the pivot is in the fourth position, wherein the second spring engages the third extension.

9. The restraint device of claim 1, further comprising:
a bar housed within at least one of the first housing or the second housing, wherein the bar hosts a first set of teeth and a second set of teeth, wherein the first set of teeth and the second set of teeth are configured to mesh in opposing directions;
a first arm coupled to the at least one of the first housing or the second housing pivotally, wherein the first arm hosts a third set of teeth, wherein the first set of teeth is configured to mesh with the third set of teeth;
a spring hosted within the first arm and engaging the first arm; and
a second arm coupled to the first arm pivotally and engaging the spring, wherein the second arm hosts a fourth set of teeth, wherein the fourth set of teeth is configured to mesh with the second set of teeth when the spring is compressed, wherein the fourth set of teeth is configured to avoid meshing with the second set of teeth when the spring is not compressed.

10. The restraint device of claim 9, wherein the second arm is arcuate.

11. The restraint device of claim 9, wherein the third set of teeth extends longitudinally immediately adjacent to the fourth set of teeth.

12. The restraint device of claim 9, wherein the third set of teeth extends longitudinally in two rows, wherein the fourth set of teeth is positioned between the two rows.

13. The restraint device of claim 9, wherein the first set of teeth extends longitudinally in two rows.

14. The restraint device of claim 13, wherein the second set of teeth is positioned between the two rows.

15. The restraint device of claim 1, wherein the sleeve includes an electronic circuit.

16. The restraint device of claim 1, wherein the sleeve includes a sensor.

17. A method comprising:
causing a user to access a restraint device comprising a first bracelet, a second bracelet, and a sleeve, wherein the first bracelet includes a first housing and a reel, wherein the reel hosts a cable, wherein the second bracelet includes a second housing, wherein the cable is coupled to the second housing; and
causing the user to slidably mount the sleeve onto the first housing and the second housing such that the cable extends through the sleeve while the sleeve extends between the first housing and the second housing and the sleeve is hollow, flexible, unitary, and substantially hour-glass shaped.

18. A method comprising:
manufacturing a restraint device comprising:
a first bracelet including a first housing and a reel, wherein the reel hosts a cable;
a second bracelet including a second housing, wherein the cable is coupled to the second housing; and
a sleeve configured to be slidably mounted onto the first housing and the second housing such that the cable extends through the sleeve while the sleeve extends between the first housing and the second housing and the sleeve is hollow, flexible, unitary, and substantially hour-glass shaped.

* * * * *